United States Patent
Liu et al.

(10) Patent No.: US 9,717,059 B2
(45) Date of Patent: Jul. 25, 2017

(54) POWER CONTROL METHOD AND APPARATUS

(71) Applicant: Huawei Technologies Co., Ltd., Shenzhen, Guangdong (CN)

(72) Inventors: Qiong Liu, Shanghai (CN); Chengyi Wang, Shanghai (CN); Dingzhang Dai, Shanghai (CN); Xiaohong Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 543 days.

(21) Appl. No.: 14/298,608

(22) Filed: Jun. 6, 2014

(65) Prior Publication Data

US 2014/0286268 A1 Sep. 25, 2014

Related U.S. Application Data

(63) Continuation of application No. PCT/CN2012/086209, filed on Dec. 7, 2012.

(30) Foreign Application Priority Data

Dec. 7, 2011 (CN) .......................... 2011 1 0403208

(51) Int. Cl.
*H04B 7/00* (2006.01)
*H04W 52/34* (2009.01)
(Continued)

(52) U.S. Cl.
CPC ......... *H04W 52/343* (2013.01); *H04W 52/24* (2013.01); *H04W 52/241* (2013.01);
(Continued)

(58) Field of Classification Search
CPC ............ H04W 52/343; H04W 52/241; H04W 52/346; H04W 52/24; H04W 52/30; Y02B 60/50
(Continued)

(56) References Cited

U.S. PATENT DOCUMENTS

| | | | |
|---|---|---|---|
| 6,128,506 | A | 10/2000 | Knutsson et al. |
| 2002/0136193 | A1 | 9/2002 | Chang et al. |

(Continued)

FOREIGN PATENT DOCUMENTS

| | | |
|---|---|---|
| CN | 101005297 A | 7/2007 |
| CN | 101212782 A | 7/2008 |

(Continued)

*Primary Examiner* — Dominic Rego

(57) ABSTRACT

Embodiments of the present invention disclose a power control method and apparatus, relate to the field of wireless communications, and are invented for reducing power pressure of an air interface of a base station and ensuring a stable network environment. The method includes: determining whether received total wideband power (RTWP) of an air interface exceeds a set first congestion threshold value; when the RTWP of the air interface exceeds the set first congestion threshold value, sending a congestion indication to a radio network controller (RNC), where the congestion indication is used for indicating that the RNC is forbidden from up-regulating a target signal-to-interference ratio (SIR); receiving a target SIR sent by the RNC; down-regulating the target SIR sent by the RNC; and notifying, based on the down-regulated target SIR, a user equipment (UE) to reduce transmit power. The present invention is mainly applied to the field of power control.

18 Claims, 12 Drawing Sheets

(51) Int. Cl.
*H04W 52/24* (2009.01)
*H04W 52/30* (2009.01)

(52) U.S. Cl.
CPC ......... *H04W 52/30* (2013.01); *H04W 52/346* (2013.01); *Y02B 60/50* (2013.01)

(58) Field of Classification Search
USPC .............. 455/522, 68, 69, 135, 161.3, 277.2
See application file for complete search history.

(56) References Cited

U.S. PATENT DOCUMENTS

| | | | |
|---|---|---|---|
| 2005/0243752 A1 | 11/2005 | Brueck et al. | |
| 2007/0173279 A1 | 7/2007 | Kuroda et al. | |
| 2008/0151819 A1* | 6/2008 | Bachl | H04W 52/146 370/329 |
| 2010/0227624 A1* | 9/2010 | De Pasquale | H04B 1/7107 455/452.2 |
| 2011/0038323 A1 | 2/2011 | Liang et al. | |

FOREIGN PATENT DOCUMENTS

| | | |
|---|---|---|
| CN | 101472295 A | 7/2009 |
| CN | 102056278 A | 5/2011 |
| CN | 102404829 A | 4/2012 |
| EP | 1 592 147 A1 | 11/2005 |
| EP | 2 429 245 A1 | 3/2012 |
| GB | 2375691 A | 11/2002 |
| JP | 2001-517893 A | 10/2001 |
| JP | 2002-533984 A | 10/2002 |
| JP | 2002344384 A | 11/2002 |
| JP | 2005-527160 A | 9/2005 |
| JP | 2005-318602 A | 11/2005 |
| JP | 2010-514358 A | 4/2010 |
| JP | 2010-518685 A | 5/2010 |
| RU | 2233035 C2 | 7/2004 |
| RU | 2280328 C2 | 7/2006 |
| WO | WO 99/16185 A1 | 4/1999 |
| WO | WO 00/38348 A1 | 6/2000 |
| WO | WO 03/101126 A1 | 12/2003 |
| WO | WO 2008/085277 A2 | 7/2008 |
| WO | WO 2008/097179 A2 | 8/2008 |
| WO | WO 2008/107425 A1 | 9/2008 |
| WO | WO 2008/117203 A2 | 10/2008 |

* cited by examiner

|  | Normal RTWP value | Actual RTWP value |
|---|---|---|
| Prior art | -105 dB | -65 dB |
| Embodiment of the present invention | -105 dB | -88 dB |

POWER CONTROL METHOD AND APPARATUS

CROSS-REFERENCE TO RELATED APPLICATIONS

This application is a continuation of International Application No. PCT/CN2012/086209, filed on Dec. 7, 2012, which claims priority to Chinese Patent Application No. 201110403208.4, filed on Dec. 7, 2011, both of which are hereby incorporated by reference in their entireties.

TECHNICAL FIELD

The present invention relates to the field of wireless communications, and in particular, to a power control method and apparatus.

BACKGROUND

In network operation, the number of user equipment's (User Equipment, UE) in a hot spot cell is numerous, which easily causes mutual competition among the UEs in the cell for a power resource of an air interface of a base station. The UEs contend for the resource of the air interface of the base station in a manner of increasing transmit power, and this phenomenon that the UEs mutually drive up the transmit power increases received total wideband power (Received Total Wideband Power, RTWP) of the air interface of the base station. When the RTWP of the air interface of the base station exceeds a certain limiting value, performance of the cell declines, a system is in an unstable state, and external instantaneous abrupt interference or power uplift of a certain internal UE may interfere with the UE in the cell. In an extreme case, the avalanche effect of the air interface may even be caused, thereby affecting experience of an edge user. For a user sensitive to quality of service (Quality of Service, QoS), such as a voice user, a momentary mute or even call drop may occur.

For example, in a case that power congestion occurs in the air interface of the base station, the UEs undergo very strong interference, and in this case, transmit power of most of the UEs is already maintained at a high level, so that an activity, such as external instantaneous interference, access of an internal UE or abrupt data transmission, may cause instantaneous and sudden deterioration of a block error rate (Block Error Rate, BLER) or a hybrid automatic repeat request (Hybrid Automatic Repeat Request, HARQ) retransmission rate of the UE in the network, thereby causing uplift of outer loop power control and resulting in that the UE uplifts the transmit power; and in the case that power congestion already occurs in the air interface of the base station, the RTWP of the air interface of the base station is further uplifted, and an environment of the air interface of the base station is deteriorated.

SUMMARY

Embodiments of the present invention provide a power control method and apparatus, which can control RTWP of an air interface of a base station when power congestion occurs in the air interface of the base station.

To achieve the foregoing purpose, the embodiments of the present invention adopt the following technical solutions:

A power control method includes:

determining whether received total wideband power RTWP of an air interface exceeds a set first congestion threshold value;

when the RTWP of the air interface exceeds the set first congestion threshold value, sending a congestion indication to a radio network controller RNC, where the congestion indication is used for indicating that the RNC is forbidden from up-regulating a target signal-to-interference ratio SIR;

receiving a target SIR sent by the RNC;

down-regulating the target SIR sent by the RNC; and notifying, based on the down-regulated target SIR, a user equipment UE to reduce transmit power.

A power control method includes:

determining whether received total wideband power RTWP of an air interface exceeds a set first congestion threshold value;

when the RTWP of the air interface exceeds the set first congestion threshold value, sending a congestion indication to a radio network controller RNC, where the congestion indication is used for indicating that the RNC is forbidden from up-regulating a target signal-to-interference ratio SIR;

receiving a target SIR sent by the RNC; and notifying, based on the target SIR sent by the RNC, a user equipment UE to limit transmit power.

A power control method includes:

receiving a target signal-to-interference ratio SIR sent by a radio network controller RNC;

determining whether received total wideband power RTWP of an air interface exceeds a set first congestion threshold value;

when the RTWP of the air interface exceeds the set first congestion threshold value, down-regulating the target SIR sent by the RNC; and notifying, based on the down-regulated target SIR, a user equipment UE to reduce transmit power.

A power control method includes:

when a base station determines that received total wideband power RTWP of an air interface of the base station exceeds a set first congestion threshold value, receiving a congestion indication sent by the base station;

forbidding, according to the congestion indication, up-regulating of a target signal-to-interference ratio SIR; and sending the target SIR without being up-regulated to the base station.

A power control apparatus includes:

a first determining unit, configured to determine whether received total wideband power RTWP of an air interface exceeds a set first congestion threshold value;

a first sending unit, configured to: when the first determining unit determines that the RTWP of the air interface exceeds the set first congestion threshold value, send a congestion indication to a radio network controller RNC, where the congestion indication is used for indicating that the RNC is forbidden from up-regulating a target signal-to-interference ratio SIR;

a first receiving unit, configured to receive a target SIR sent by the RNC;

a first control unit, configured to down-regulate the target SIR sent by the RNC and received by the first receiving unit; and a first notifying unit, configured to notify, based on the target SIR down-regulated by the first control unit, a user equipment UE to reduce transmit power.

A power control apparatus includes:

a second determining unit, configured to determine whether received total wideband power RTWP of an air interface exceeds a set first congestion threshold value;

a second sending unit, configured to: when the second determining unit determines that the RTWP of the air interface exceeds the set first congestion threshold value, send a congestion indication to a radio network controller RNC, where the congestion indication is used for indicating that the RNC is forbidden from up-regulating a target signal-to-interference ratio SIR;

a second receiving unit, configured to receive a target SIR sent by the RNC; and a second notifying unit, configured to notify, based on the target SIR sent by the RNC and received by the second receiving unit, a user equipment UE to limit transmit power.

A power control apparatus includes:

a third receiving unit, configured to receive a target signal-to-interference ratio SIR sent by a radio network controller RNC;

a third determining unit, configured to determine whether received total wideband power RTWP of an air interface exceeds a set first congestion threshold value;

a third control unit, configured to: when the third determining unit determines that the RTWP of the air interface exceeds the set first congestion threshold value, down-regulate the target SIR sent by the RNC; and a third notifying unit, configured to notify, based on the target SIR down-regulated by the third control unit, a user equipment UE to reduce transmit power.

A power control apparatus includes:

a fourth receiving unit, configured to: when a base station determines that received total wideband power RTWP of an air interface of the base station exceeds a set first congestion threshold value, receive a congestion indication sent by the base station;

a processing unit, configured to forbid, according to the congestion indication received by the fourth receiving unit, up-regulating of a target signal-to-interference ratio SIR; and a fourth sending unit, configured to send the target SIR without being up-regulated to the base station.

In the power control method and apparatus provided in the embodiments of the present invention, rise of a target SIR of a UE can be limited in a case of power congestion of an air interface of a base station, which avoids congestion pressure formed by further rise of transmit power of the UE on already excessively high RTWP of the air interface of the base station. Meanwhile, in an implementation scenario of the present invention, a value of the target SIR which is already limited to rise can also be down-regulated, so as to reduce the transmit power of the UE. A problem of power congestion of the air interface of the base station is solved, a state of a system is stabilized, and service quality of an edge user and a QoS-sensitive user is ensured.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and persons of ordinary skill in the art may further obtain other drawings according to these accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
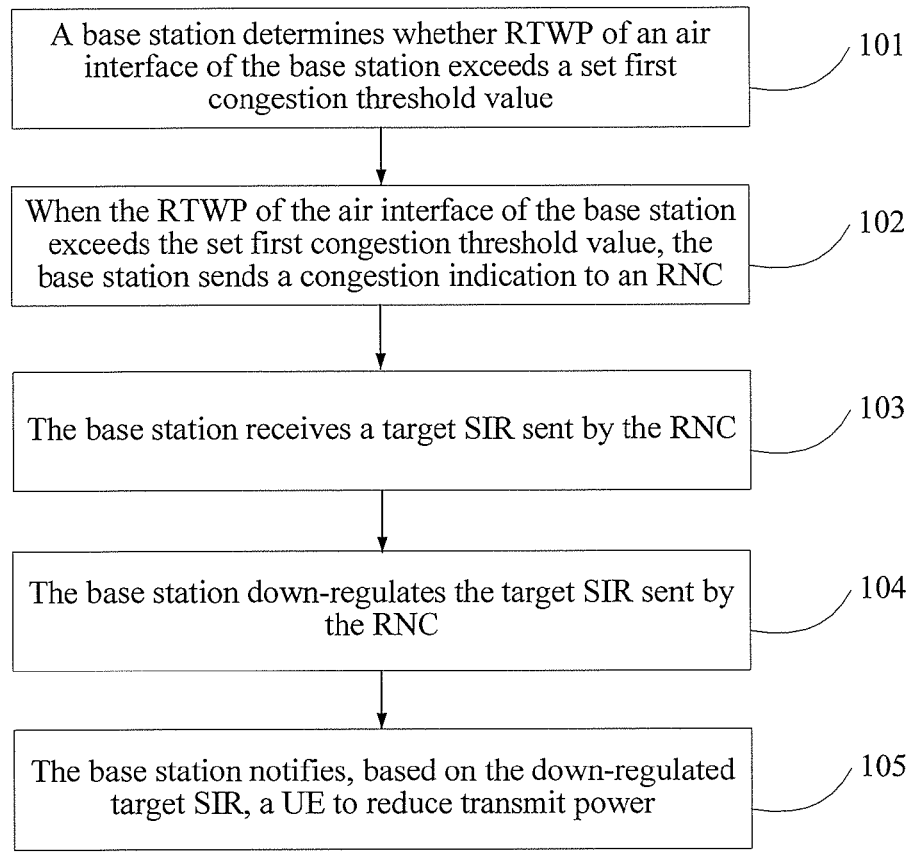
FIG. 1 is a flow chart of a power control method according to Embodiment 1 of the present invention.

The embodiment of the present invention provides a power control method. As shown in FIG. 1, the method includes the following steps.

101: A base station determines whether RTWP of an air interface of the base station exceeds a set first congestion threshold value.

The RTWP of the air interface is a sum of transmit power of all UEs pertaining to the base station. When the RTWP of the air interface exceeds the first congestion threshold value, a congestion phenomenon occurs in the base station, and the RTWP on the air interface of the base station needs to be controlled.

102: When the RTWP of the air interface of the base station exceeds the set first congestion threshold value, the base station sends a congestion indication to an RNC.

The congestion indication is used for indicating that the RNC is forbidden from up-regulating a target SIR. The RNC may adjust a target SIR of a UE according to a block error rate, an HARQ retransmission rate or an air interface packet loss rate when the UE uploads data. Taking the block error rate as an example: If the block error rate is excessively high when the UE uploads data, the RNC up-regulates the target SIR of the UE, so as to increase transmit power of the UE, thereby reducing the block error rate; if the block error rate is small when the UE uploads data, in order to save transmit power of uplink data, the RNC down-regulates the target SIR of the UE, so as to reduce the transmit power of the UE. When congestion occurs in the air interface of the base station, in order to ensure whole stability of the network, even if the block error rate is high when the UE uploads data, the RNC is not allowed to up-regulate the target SIR of the UE, thereby ensuring that the RTWP of the air interface of the base station does not further rise.

103: The base station receives a target SIR sent by the RNC.

When the RTWP of the air interface of the base station exceeds the first congestion threshold value, the base station sends a congestion indication to the RNC, indicating that the RNC is forbidden from up-regulating the target SIR. In a case that the target SIR needs to be up-regulated, the RNC does not up-regulate the target SIR according to the congestion indication sent by the base station, and sends the target SIR without being up-regulated to the base station. The base station receives the target SIR which is sent by the RNC and is limited to rise.

104: The base station down-regulates the target SIR sent by the RNC.

The base station down-regulates the target SIR limited by the RNC to rise. That the RNC limits rise of the target SIR may ensure that the RTWP of the air interface of the base station does not further rise, but because the congestion phenomenon already occurs in the base station, merely limiting the RTWP of the air interface of the base station cannot eliminate the congestion phenomenon of the base station. Therefore, the base station needs to down-regulate the target SIR limited by the RNC to rise, so as to further reduce the target SIR of the UE, and then reduce the transmit power of the UE, thereby reducing the RTWP of the air interface of the base station to a value lower than the first congestion threshold value.

105: The base station notifies, based on the down-regulated target SIR, a UE to reduce transmit power.

An SIR is defined as a ratio of transmit power to an interference signal when a UE transmits uplink data. For a certain UE, magnitude of an interference signal generally does not greatly change, and may be approximately considered unchanged. When the target SIR is reduced through down-regulation of the base station, an actual SIR of the UE for uploading data can be reduced to the target SIR only if the transmit power of the UE is reduced, thereby achieving a purpose of reducing the transmit power of the UE and reducing the RTWP of the air interface of the base station.

In the power control method provided in the embodiment of the present invention, rise of a target SIR of a UE can be limited in a case of power congestion of an air interface of a base station, which avoids congestion pressure formed by further rise of transmit power of the UE on already excessively high RTWP of the air interface of the base station. Meanwhile, in an application scenario of the embodiment of the present invention, a value of the target SIR which is already limited to rise can also be down-regulated, so as to reduce the transmit power of the UE. A problem of power congestion of the air interface of the base station is solved, a state of a system is stabilized, and service quality of an edge user and a QoS-sensitive user is ensured.

Embodiment 2

Figure 2:
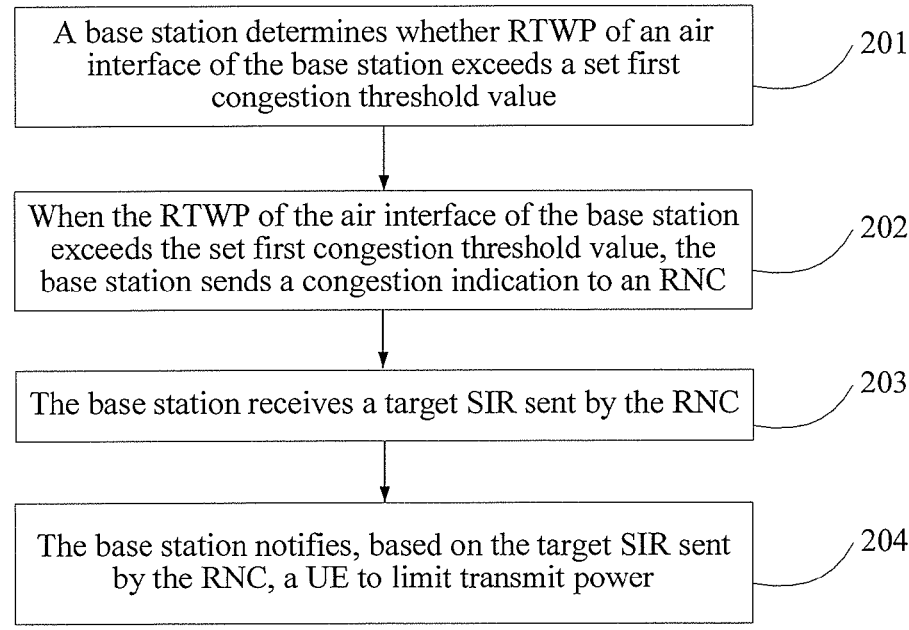
FIG. 2 is a flow chart of a power control method according to Embodiment 2 of the present invention.

The embodiment of the present invention provides a power control method. As shown in FIG. 2, the method includes the following steps.

201: A base station determines whether RTWP of an air interface of the base station exceeds a set first congestion threshold value.

The RTWP of the air interface is a sum of transmit power of all UEs pertaining to the base station. When the RTWP of the air interface exceeds the first congestion threshold value, a congestion phenomenon occurs in the base station, and the RTWP on the air interface of the base station needs to be controlled.

202: When the RTWP of the air interface of the base station exceeds the set first congestion threshold value, the base station sends a congestion indication to an RNC.

The congestion indication is used for indicating that the RNC is forbidden from up-regulating a target SIR. The RNC may adjust a target SIR of a UE according to a block error rate, an HARQ retransmission rate or an air interface packet loss rate when the UE uploads data. Taking the block error rate as an example: If the block error rate is excessively high when the UE uploads data, the RNC up-regulates the target SIR of the UE, so as to increase transmit power of the UE, thereby reducing the block error rate; if the block error rate is small when the UE uploads data, in order to save transmit power of uplink data, the RNC down-regulates the target SIR of the UE, so as to reduce the transmit power of the UE. When congestion occurs in the air interface of the base station, in order to ensure whole stability of the network, even if the block error rate is high when the UE uploads data, the RNC is not allowed to up-regulate the target SIR of the UE, thereby ensuring that the RTWP of the air interface of the base station does not further rise.

203: The base station receives a target SIR sent by the RNC.

When the RTWP of the air interface of the base station exceeds the first congestion threshold value, the base station sends a congestion indication to the RNC, indicating that the RNC is forbidden from up-regulating the target SIR. In a case that the target SIR needs to be up-regulated, the RNC does not up-regulate the target SIR according to the congestion indication sent by the base station, and sends the target SIR without being up-regulated to the base station. The base station receives the target SIR which is sent by the RNC and is limited to rise.

204: The base station notifies, based on the target SIR sent by the RNC, a UE to limit transmit power.

An SIR is defined as a ratio of transmit power to an interference signal when a UE transmits uplink data. For a certain UE, magnitude of an interference signal generally does not greatly change, and may be approximately considered unchanged. When the target SIR does not rise when being limited by the RNC, the transmit power of the UE does not rise either, thereby achieving a purpose of limiting the transmit power of the UE.

In the power control method provided in the embodiment of the present invention, rise of a target SIR of a UE can be limited in a case of power congestion of an air interface of a base station, which avoids congestion pressure formed by further rise of transmit power of the UE on already excessively high RTWP of the air interface of the base station.

Embodiment 3

Figure 3:
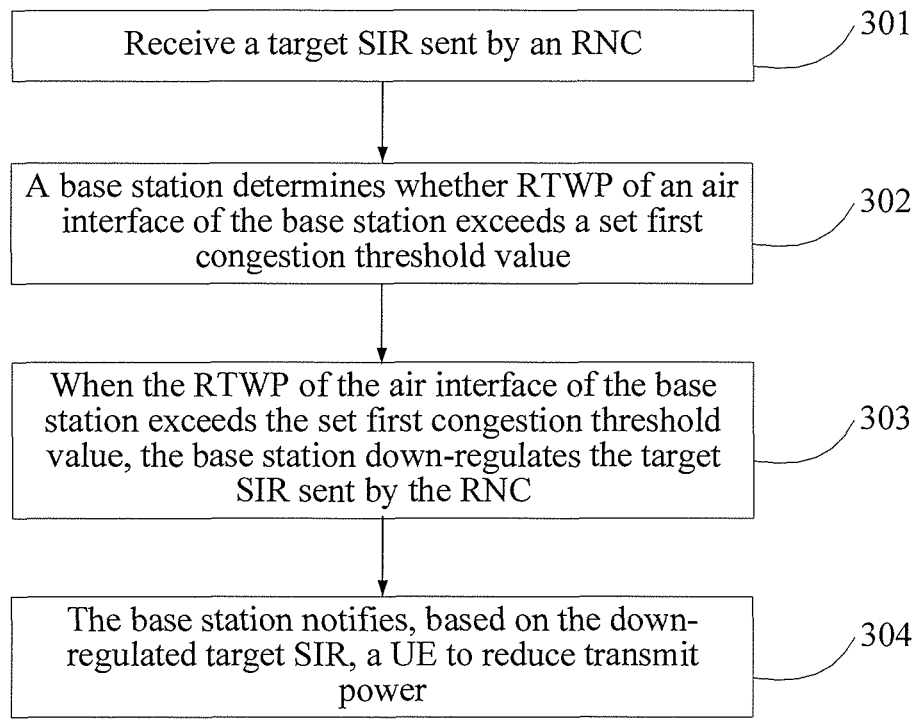
FIG. 3 is a flow chart of a power control method according to Embodiment 3 of the present invention.

The embodiment of the present invention provides a power control method. As shown in FIG. 3, the method includes the following steps.

301: Receive a target SIR sent by an RNC.

302: A base station determines whether RTWP of an air interface of the base station exceeds a set first congestion threshold value.

The RTWP of the air interface is a sum of transmit power of all UEs pertaining to the base station. When the RTWP of the air interface exceeds the first congestion threshold value, a congestion phenomenon occurs in the base station, and the RTWP on the air interface of the base station needs to be controlled.

303: When the RTWP of the air interface of the base station exceeds the set first congestion threshold value, the base station down-regulates the target SIR sent by the RNC.

The base station down-regulates the target SIR sent by the RNC, thereby reducing transmit power of a UE, and reducing the RTWP of the air interface of the base station to a value lower than the first congestion threshold value.

304: The base station notifies, based on the down-regulated target SIR, a UE to reduce transmit power.

An SIR is defined as a ratio of transmit power to an interference signal when a UE transmits uplink data. For a certain UE, magnitude of an interference signal generally does not greatly change, and may be approximately considered unchanged. When the target SIR is reduced through down-regulation of the base station, an actual SIR of the UE for uploading data can be reduced to the target SIR only if the transmit power of the UE is reduced, thereby achieving a purpose of reducing the transmit power of the UE and reducing the RTWP of the air interface of the base station.

In the power control method provided in the embodiment of the present invention, a value of the target SIR sent by the RNC can be down-regulated, so as to reduce the transmit power of the UE. A problem of power congestion of the air interface of the base station is solved, a state of a system is stabilized, and service quality of an edge user and a QoS-sensitive user is ensured.

Embodiment 4

Figure 4:
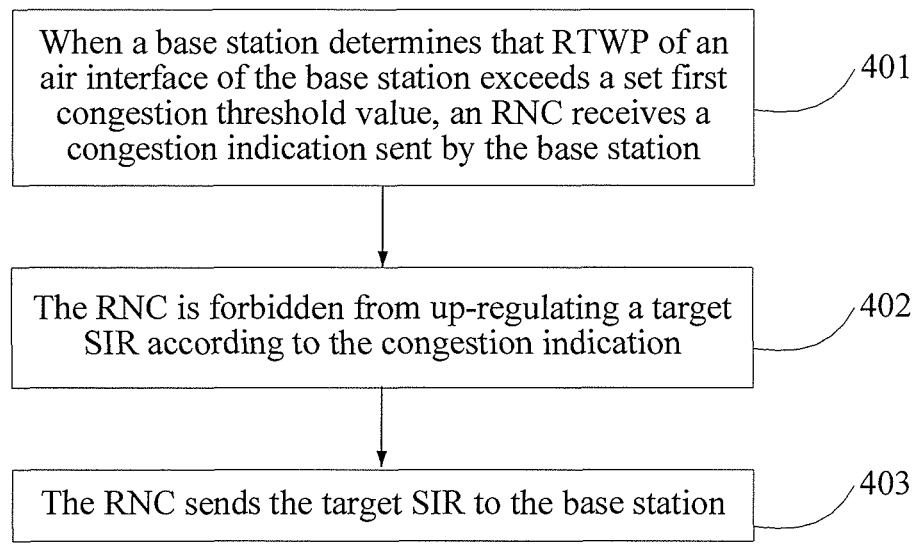
FIG. 4 is a flow chart of a power control method according to Embodiment 4 of the present invention.

The embodiment of the present invention provides a power control method. As shown in FIG. 4, the method includes the following steps.

401: When a base station determines that RTWP of an air interface of the base station exceeds a set first congestion threshold value, an RNC receives a congestion indication sent by the base station.

The congestion indication is used for indicating that the RNC is forbidden from up-regulating a target SIR. The RNC may adjust a target SIR of a UE according to a block error rate, an HARQ retransmission rate or an air interface packet loss rate when the UE uploads data. Taking the block error rate as an example: If the block error rate is high when the UE uploads data, the RNC up-regulates the target SIR of the UE, so as to increase transmit power of the UE, thereby reducing the block error rate; if the block error rate is small when the UE uploads data, in order to save transmit power of uplink data, the RNC down-regulates the target SIR of the UE, so as to reduce the transmit power of the UE. When congestion occurs in the air interface of the base station, in order to ensure whole stability of the network, even if the block error rate is high when the UE uploads data, the RNC is not allowed to up-regulate the target SIR of the UE, thereby ensuring that the RTWP of the air interface of the base station does not further rise.

402: According to the congestion indication, the RNC is forbidden from up-regulating the target SIR.

After the base station sends the congestion indication to the RNC, the RNC is forbidden from up-regulating the target SIR of the UE, but if the block error rate is small when the UE uploads data, the RNC may down-regulate the target SIR of the UE. Down-regulation of the target SIR of the UE does not further increase the RTWP of the air interface of the base station, while instead, further reduces the RTWP of the air interface of the base station, so a function of down-regulating the target SIR of the UE by the RNC is not limited.

403: The RNC sends the target SIR to the base station.

When the RTWP of the air interface of the base station exceeds the first congestion threshold value, the base station sends a congestion indication to the RNC, indicating that the RNC is forbidden from up-regulating the target SIR. In a case that the target SIR needs to be up-regulated, the RNC does not up-regulate the target SIR according to the congestion indication sent by the base station, and sends the target SIR without being up-regulated to the base station.

In an application scenario of the embodiment of the present invention, after the RNC sends the target SIR to the base station, the base station may further down-regulate the target SIR sent by the RNC, so as to reduce the target SIR, thereby reducing the transmit power of the UE, and further reducing power pressure of the air interface of the base station.

In the power control method provided in the embodiment of the present invention, rise of a target SIR of a UE can be limited in a case of power congestion of an air interface of a base station, which avoids congestion pressure formed by further rise of transmit power of the UE on already excessively high RTWP of the air interface of the base station. Meanwhile, in an application scenario of the embodiment of the present invention, a value of the target SIR which is already limited to rise can also be down-regulated, so as to reduce the transmit power of the UE. A problem of power congestion of the air interface of the base station is solved, a state of a system is stabilized, and service quality of an edge user and a QoS-sensitive user is ensured.

Embodiment 5

Figure 5:
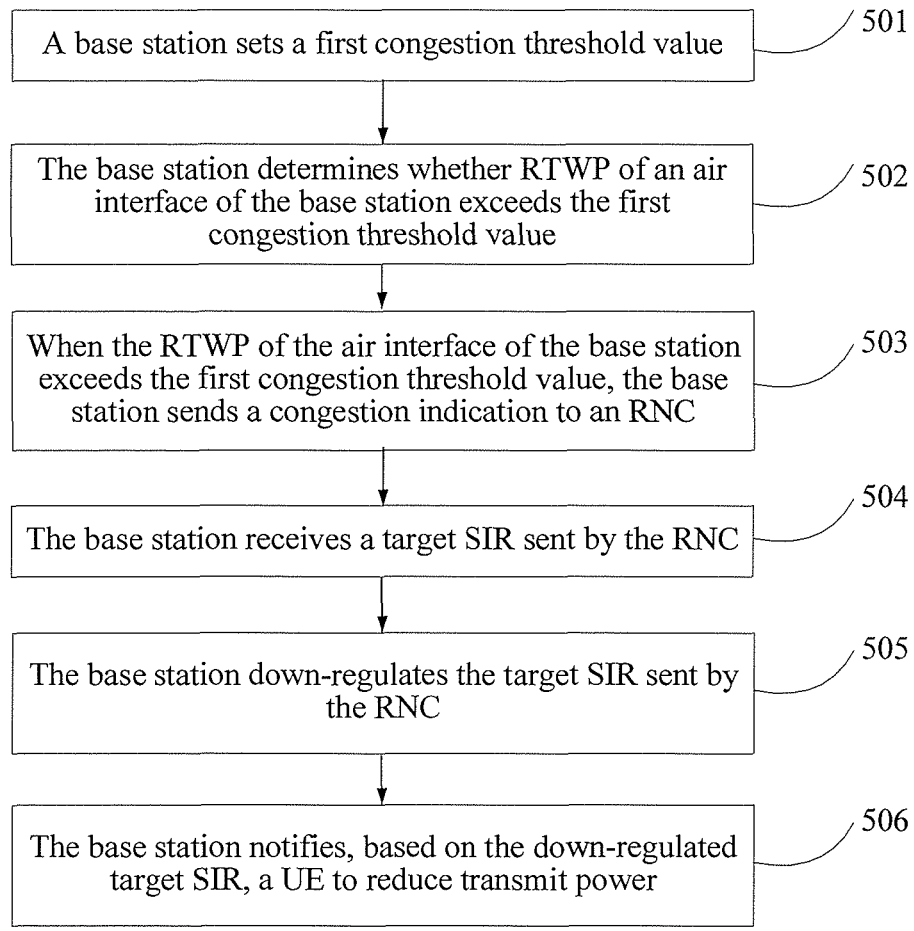
FIG. 5 is a flow chart of a power control method according to Embodiment 5 of the present invention.

The embodiment of the present invention provides a power control method. As shown in FIG. 5, the method includes the following steps.

501: A base station sets a first congestion threshold value.

The first congestion threshold value may be set by an operator according to a current network condition in an actual operating environment, different first congestion threshold values may also be set for cells with different current network conditions, and meanwhile, different first congestion threshold values may also be set for a cell according to different current network conditions of the same cell in different periods of time, which is not limited in the embodiment of the present invention.

502: The base station determines whether RTWP of an air interface of the base station exceeds the first congestion threshold value.

The RTWP of the air interface is a sum of transmit power of all UEs pertaining to the base station. When the RTWP of the air interface exceeds the first congestion threshold value, a congestion phenomenon occurs in the base station, a state of the cell is unstable, and coverage quality of an edge user declines. Particularly for a service sensitive to QoS, such as voice service, a phenomenon, such as transient call stagnation or a voice delay, is generated easily, and a call drop phenomenon is further generated in a serious case, thereby affecting service experience of a user. Therefore, when the RTWP of the air interface of the base station exceeds the first congestion threshold value, the RTWP on the air interface of the base station needs to be limited.

503: When the RTWP of the air interface of the base station exceeds the first congestion threshold value, the base station sends a congestion indication to an RNC.

The congestion indication is used for indicating that the RNC is forbidden from up-regulating a target SIR. The RNC may adjust a target SIR of a UE according to a block error rate, an HARQ retransmission rate or an air interface packet loss rate when the UE uploads data. Taking the block error rate as an example: If the block error rate is relatively high when the UE uploads data, the RNC up-regulates the target SIR of the UE, so as to increase transmit power of the UE, thereby reducing the block error rate; if the block error rate is small when the UE uploads data, in order to save transmit power of uplink data, the RNC down-regulates the target SIR of the UE, so as to reduce the transmit power of the UE. When congestion occurs in the air interface of the base station, in order to ensure whole stability of the network, even if the block error rate is high when the UE uploads data, the RNC is not allowed to up-regulate the target SIR of the UE, thereby ensuring that the RTWP of the air interface of the base station does not further rise.

It should be noted that, after the base station sends the congestion indication to the RNC, the RNC is forbidden from up-regulating the target SIR of the UE, but if the block error rate is small when the UE uploads data, the RNC may down-regulate the target SIR of the UE. Down-regulation of the target SIR of the UE does not further increase the RTWP of the air interface of the base station, while instead, further reduces the RTWP of the air interface of the base station, so a function of down-regulating the target SIR of the UE by the RNC is not limited.

In an application scenario of the embodiment of the present invention, before sending the congestion indication to the RNC, the base station may further stop uplink packet scheduling. Compared with a circuit switched domain service, QoS sensitivity of a packet switched domain service is low, and when the RTWP of the air interface of the base station exceeds the first congestion threshold value, a packet switched domain may be preferentially stopped from continuously uploading a large data packet, so as to alleviate power pressure of the air interface of the base station. For example, a larger data packet of the user may be temporarily stopped from being uploaded, and from the perspective of a user plane, in a case that transmission time for uploading service data is long, waiting time added by short-time uplink stop of a large data packet cuts down marginal utility of the user, and the cut-down does not cause more influence on user experience.

504: The base station receives a target SIR sent by the RNC.

When the RTWP of the air interface of the base station exceeds the first congestion threshold value, the base station sends a congestion indication to the RNC, indicating that the RNC is forbidden from up-regulating the target SIR. In a case that the target SIR needs to be up-regulated, the RNC does not up-regulate the target SIR according to the congestion indication sent by the base station, and sends the target SIR without being up-regulated to the base station. The base station receives the target SIR which is sent by the RNC and is limited to rise.

505: The base station down-regulates the target SIR sent by the RNC.

The base station down-regulates the target SIR limited by the RNC to rise. That the RNC limits rise of the target SIR can ensure that the RTWP of the air interface of the base station does not further rise, but because the congestion phenomenon already occurs in the base station, merely limiting the RTWP of the air interface of the base station cannot eliminate the congestion phenomenon of the base station. Therefore, the base station needs to down-regulate the target SIR limited by the RNC to rise, so as to further reduce the target SIR of the UE, and then reduce the transmit power of the UE, thereby reducing the RTWP of the air interface of the base station to a value lower than the first congestion threshold value.

In an application scenario of the embodiment of the present invention, the base station may periodically and evenly down-regulate the target SIR. For example, the target SIR may be down-regulated by 0.2 dB every 10 ms, and setting of a period length and a down-regulation extent in a period are not limited in the embodiment of the present invention.

In another application scenario of the embodiment of the present invention, the base station may further shorten a down-regulation period, and the target SIR of the UE is down-regulated through a fast small-step period, so as to strengthen a down-regulation effect. A period during which the RNC adjusts the target SIR of the UE in a manner of outer loop power control is long, so shortening of the period during which the RNC adjusts the target SIR of the UE easily causes a traffic impact on an interface between the RNC and the base station. Therefore, down-regulation of a small step period may be performed on the target SIR of the UE through the base station itself.

506: The base station notifies, based on the down-regulated target SIR, a UE to reduce transmit power.

An SIR is defined as a ratio of transmit power to an interference signal when a UE transmits uplink data. For a certain UE, magnitude of an interference signal generally does not greatly change, and may be approximately considered unchanged. When the target SIR is reduced through down-regulation of the base station, an actual SIR of the UE for uploading data can be reduced to the target SIR only if the transmit power of the UE is reduced, thereby achieving a purpose of reducing the transmit power of the UE and reducing the RTWP of the air interface of the base station. For example, in a wideband code division multiple access (Wideband Code Division Multiple Access, WCDMA) network, different carriers use a same frequency point, which generates a self-interference phenomenon, namely, for a certain UE, transmit power of another UE is an interference signal of the UE. Numerous UEs exist in the cell, so for a UE, an interference signal generated by another UE is approximately stable. Therefore, a value of an actual SIR of the UE may be reduced by reducing the transmit power of the UE.

In an application scenario of the embodiment of the present invention, the base station may perform down-regulation on the transmit power of the UE according to the target SIR on a granularity of a time slot grade, thereby further improving fineness and real time performance of controlling the RTWP of the air interface of the base station.

It should be noted that, the actual SIR of the UE measured by the base station is not strictly equal to the target SIR, but fluctuates around the target SIR and converges at the target SIR. The actual SIR is greater than the target SIR or less than the target SIR, but the target SIR serves as a basis on which the base station adjusts the transmit power of the UE, and still has guiding significance for the actual SIR. When the target SIR declines, the actual SIR also declines in a corresponding fluctuation interval, thereby achieving a purpose of reducing the transmit power of the UE.

In another application scenario of the embodiment of the present invention, the RNC may be further protected from abnormality. After the air interface of the base station reaches the first congestion threshold value, the RNC is in a state of being forbidden from up-regulating the target SIR. If in a period of time, the RNC does not receive a congestion indication resent by the base station, the limitation of being forbidden from up-regulating the target SIR is automatically removed, and the RNC may up-regulate or down-regulate the target SIR of the UE according to the block error rate, the HARQ retransmission rate or the air interface packet loss rate when the UE uploads the data. The period of time is a ban lifting duration set by the operator according to the actual operating environment. A function of forbidding the RNC from up-regulating the target SIR may limit further rise of the RTWP of the air interface of the base station, but this limitation is at the cost of reducing a data packet transmission success ratio. In an operating procedure, at the same time of ensuring that the RTWP of the air interface of the base station does not exceed the first congestion threshold value, the data packet transmission success ratio needs to be further considered, so the RNC needs to be protected from abnormality.

Further, in another application scenario of the embodiment of the present invention, when the RTWP of the air interface of the base station declines to a value lower than the first congestion threshold value, the base station may up-regulate the target SIR sent by the RNC. A purpose of up-regulating the target SIR lies in that, after the power pressure of the air interface of the base station is alleviated, the transmit power of the UE is up-regulated in a manner of up-regulating the target SIR, so as to improve a success ratio at which the UE sends a data packet. The base station steadily up-regulates the target SIR with a small step, and that the target SIR to be up-regulated does not exceed a target SIR when the RTWP of the base station is equal to the first congestion threshold value is taken as a limitation, thereby improving the success ratio at which the UE sends a data packet as much as possible and ensuring quality of a user service in a case that the RTWP of the air interface of the base station does not exceed the first congestion threshold value again. It should be noted that, the actual SIR of the UE for sending the data packet fluctuates around the target SIR and converges at the target SIR, so a case that an up-regulated target SIR does not exceed the target SIR when the RTWP of the base station is equal to the first congestion threshold value, but an increased RTWP of the air interface of the base station again exceeds the first congestion threshold value occurs. In this case, step 503 to step 506 are repetitively executed, the RTWP of the air interface of the base station is down-regulated again, and for a specific procedure, reference may be made to the implementation of step 503 to step 506 in FIG. 5, and details are not repeatedly described herein.

Figure 6:
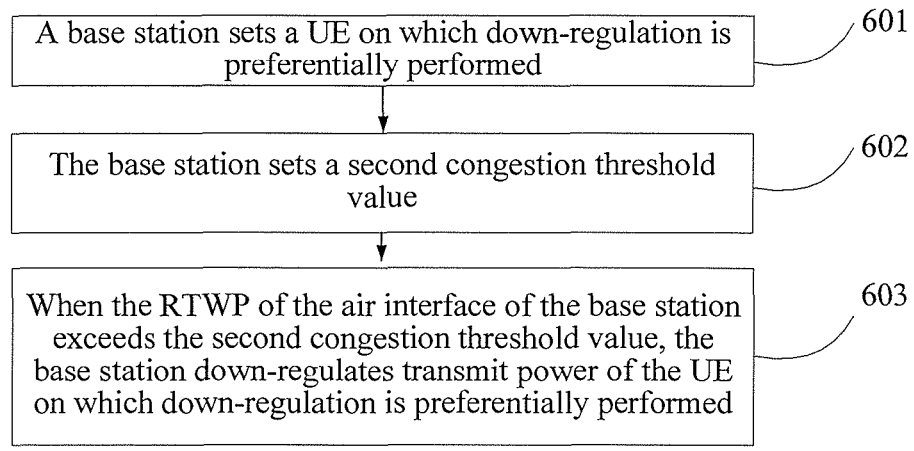
FIG. 6 is a flow chart of an exemplary solution for power control according to Embodiment 5 of the present invention.

Much further, in another application scenario of the embodiment of the present invention, in the embodiment of the present invention, a UE on which down-regulation is preferentially performed may be further set according to a user service feature and a user data transmission state, and a second congestion threshold value may be further set. When the RTWP of the air interface of the base station exceeds the second congestion threshold value, power down-regulation is first performed on the UE on which down-regulation is preferentially performed, so as to alleviate the power pressure of the air interface of the base station. Details are as shown in FIG. 6, and on the basis of FIG. 5, the exemplary solution further includes the following steps.

601: A base station sets a UE on which down-regulation is preferentially performed.

A UE on which down-regulation is preferentially performed may be set according to a sensitivity degree to QoS. For example, a voice service in a circuit switched domain is sensitive to QoS, a data packet uploading service in a packet switched domain is insensitive to QoS, and a UE executing a packet switched domain service may be set as a UE on which down-regulation is preferentially performed. The voice service is sensitive to QoS, so excessively small transmit power of the UE causes transient stagnation or even a call drop of a call service, thereby causing a large influence on user experience. When transmit power of a service of uploading a data packet is small, although an uploading stagnation phenomenon also occurs in a procedure of data packet uploading, no excessively large utility cut-down is generated for a user; therefore, comparatively speaking, when transmit power of some UEs needs to be reduced, transmit power of a UE executing a circuit switched domain service needs to be preferentially protected, and transmit power of the UE executing the packet switched domain service may be preferentially down-regulated.

In an application scenario of the embodiment of the present invention, the base station may further set, according to whether a UE is performing data transmission, a UE on which down-regulation is preferentially performed. For example, a UE performing no data transmission may be set as a UE on which down-regulation is preferentially performed. From the perspective of network operation, maintaining transmit power of the UE performing no data transmission is a waste of power of the air interface of the base station, while from the perspective of user utility, in a UE with data transmission and a UE without data transmission, transmit power of the UE with data transmission should be preferentially ensured, so comparatively speaking, when transmit power of some UEs needs to be reduced, the transmit power of the UE with data transmission needs to be preferentially protected, and transmit power of the UE without data transmission may be preferentially down-regulated.

In another application scenario of the embodiment of the present invention, a UE on which down-regulation is preferentially performed may be set by combining the foregoing two setting manners. For example, a UE performing no data transmission is further selected from a UE executing a packet switched domain service, and down-regulation is preferentially performed on the UE. Furthermore, in a power down-regulating procedure, for the UE performing no data transmission, transmit power of the UE may be down-regulated to a power level as long as the power level can ensure transmission quality of a control channel. The foregoing may all be set, adjusted and combined by an operator according to an operating policy in an actual operating environment, which is not limited in the embodiment of the present invention.

602: The base station sets a second congestion threshold value.

The second congestion threshold value is less than the first congestion threshold value. A purpose of setting the second congestion threshold value lies in that, when the RTWP of the air interface of the base station reaches the second congestion threshold value but has not reached the first congestion threshold value yet, transmit power of a part of UEs is down-regulated in advance, so as to alleviate a part of power pressure of the air interface of the base station before the RTWP of the air interface of the base station reaches the first congestion threshold value. The part of UEs is the UE on which down-regulation is preferentially performed set in step 601.

603: When the RTWP of the air interface of the base station exceeds the second congestion threshold value, the base station down-regulates transmit power of the UE on which down-regulation is preferentially performed.

The down-regulating the transmit power includes the following steps:

(1) the base station receives a target SIR of the UE on which down-regulation is preferentially performed that is sent by the RNC;

(2) the base station down-regulates the target SIR of the UE on which down-regulation is preferentially performed that is sent by the RNC; and (3) the base station notifies, based on the down-regulated target SIR of the UE on which down-regulation is preferentially performed, the UE on which down-regulation is preferentially performed to reduce transmit power.

Execution procedures of step (1), step (2) and step (3) may correspond to step 504, step 505 and step 506 in FIG. 5 respectively, reference may be made to implementation of step 504, step 505 and step 506 in FIG. 5, and details are not repeatedly described herein.

Figures 7, 8:
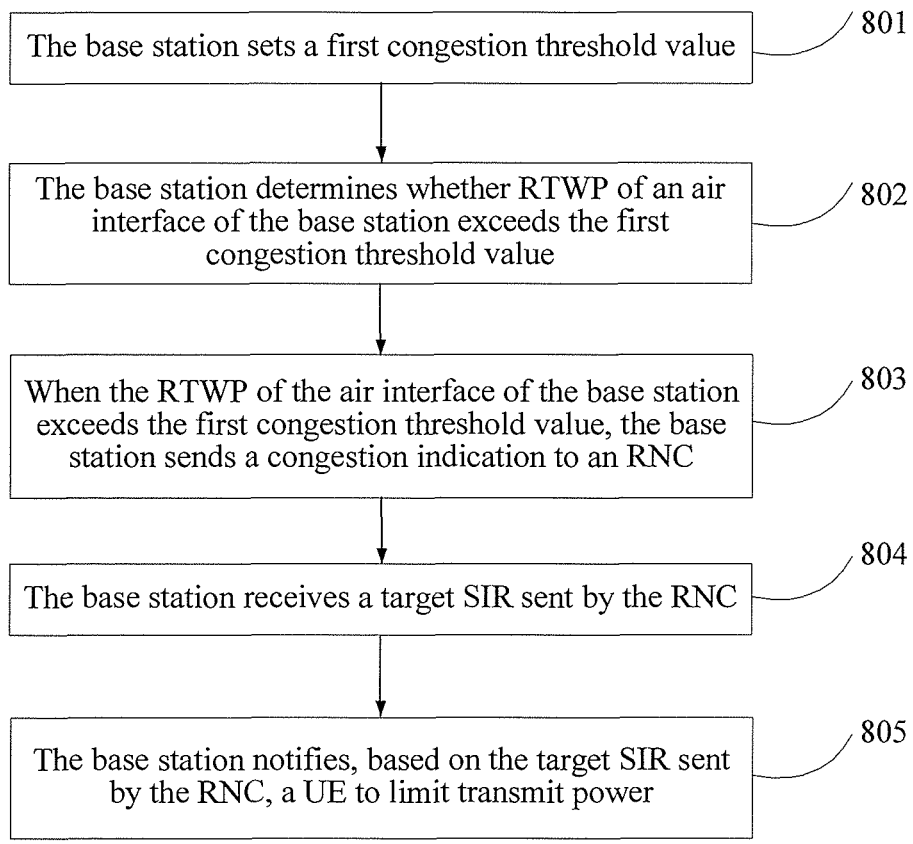
FIG. 7 is a comparison table of data before and after adopting Embodiment 5 of the present invention according to Embodiment 5 of the present invention.
FIG. 8 is a flow chart of a power control method according to Embodiment 6 of the present invention.

An application scenario of the embodiment of the present invention is shown in FIG. 7, and because of a drive-up effect of the transmit power of the UE, the RTWP of the air interface of the base station in the prior art rises from a normal value −105 dB to −65 dB. After power control optimization of the base station, the RTWP of the air interface of the base station rises from the normal value to −88 dB, and the RTWP declines by 23 dB compared with −65 dB in the prior art, thereby effectively down-regulating the RTWP of the air interface of the base station, and alleviating the power pressure of the air interface of the base station.

In the power control method provided in the embodiment of the present invention, rise of a target SIR of a UE can be limited in a case of power congestion of an air interface of a base station, which avoids congestion pressure formed by further rise of transmit power of the UE on already excessively high RTWP of the air interface of the base station. Meanwhile, in an application scenario of the embodiment of the present invention, a value of the target SIR which is already limited to rise can also be down-regulated, so as to reduce the transmit power of the UE. A problem of power congestion of the air interface of the base station is solved, a state of a system is stabilized, and service quality of an edge user and a QoS-sensitive user is ensured.

Furthermore, in an application scenario of the embodiment of the present invention, before the RTWP of the air interface of the base station reaches the first congestion threshold value, transmit power of a part of UEs executing a QoS-insensitive service and/or performing no data transmission in the cell can be further preferentially down-regulated. These UEs having a small influence on the user utility make more contribution to down-regulation of the RTWP of the air interface of the base station, transmit power of a UE executing a QoS-sensitive service is further ensured or increased at the same time, and in a case of reducing the RTWP of the air interface of the base station, it is ensured that the service quality of the QoS-sensitive user is not affected by the down-regulation of the RTWP of the air interface of the base station.

Furthermore, in an application scenario of the embodiment of the present invention, abnormality protection can be further set for the RNC, and while it is ensured that the RTWP of the air interface of the base station does not exceed the first congestion threshold value, the data packet transmission success ratio can be further considered at the same time.

Embodiment 6

The embodiment of the present invention provides a power control method. As shown in FIG. 8, the method includes the following steps.

801: A base station sets a first congestion threshold value.

The first congestion threshold value may be set by an operator according to a current network condition in an actual operating environment, different first congestion threshold values may also be set for cells with different current network conditions, and meanwhile, different first congestion threshold values may also be set for a cell according to different current network conditions of the same cell in different periods of time, which is not limited in the embodiment of the present invention.

802: The base station determines whether RTWP of an air interface of the base station exceeds the first congestion threshold value.

The RTWP of the air interface is a sum of transmit power of all UEs pertaining to the base station. When the RTWP of the air interface exceeds the first congestion threshold value, a congestion phenomenon occurs in the base station, a state of the cell is unstable, and coverage quality of an edge user declines. Particularly for a service sensitive to QoS, such as voice service, a phenomenon, such as transient call stagnation or a voice delay, is generated easily, and a call drop phenomenon is further generated in a serious case, thereby affecting service experience of a user. Therefore, when the RTWP of the air interface of the base station exceeds the first congestion threshold value, the RTWP on the air interface of the base station needs to be limited.

803: When the RTWP of the air interface of the base station exceeds the first congestion threshold value, the base station sends a congestion indication to an RNC.

The congestion indication is used for indicating that the RNC is forbidden from up-regulating a target SIR. The RNC may adjust a target SIR of a UE according to a block error rate, an HARQ retransmission rate or an air interface packet loss rate when the UE uploads data. Taking the block error rate as an example: If the block error rate is relatively high when the UE uploads data, the RNC up-regulates the target SIR of the UE, so as to increase transmit power of the UE, thereby reducing the block error rate; if the block error rate is small when the UE uploads data, in order to save transmit power of uplink data, the RNC down-regulates the target SIR of the UE, so as to reduce the transmit power of the UE. When congestion occurs in the air interface of the base station, in order to ensure whole stability of the network, even if the block error rate is high when the UE uploads data, the RNC is not allowed to up-regulate the target SIR of the UE, thereby ensuring that the RTWP of the air interface of the base station does not further rise.

It should be noted that, after the base station sends the congestion indication to the RNC, the RNC is forbidden from up-regulating the target SIR of the UE, but if the block error rate is small when the UE uploads data, the RNC may down-regulate the target SIR of the UE. Down-regulation of the target SIR of the UE does not further increase the RTWP of the air interface of the base station, while instead, further reduces the RTWP of the air interface of the base station, so a function of down-regulating the target SIR of the UE by the RNC is not limited.

In an application scenario of the embodiment of the present invention, before sending the congestion indication to the RNC, the base station may further stop uplink packet scheduling. Compared with a circuit switched domain service, QoS sensitivity of a packet switched domain service is low, and when the RTWP of the air interface of the base station exceeds the first congestion threshold value, a packet switched domain may be preferentially stopped from continuously uploading a large data packet, so as to alleviate power pressure of the air interface of the base station. For example, a larger data packet of the user may be temporarily stopped from being uploaded, and from the perspective of a user plane, in a case that transmission time for uploading service data is long, waiting time added by short-time uplink stop of a large data packet cuts down marginal utility of the user, and the cut-down does not cause more influence on user experience.

804: The base station receives a target SIR sent by the RNC.

When the RTWP of the air interface of the base station exceeds the first congestion threshold value, the base station sends a congestion indication to the RNC, indicating that the RNC is forbidden from up-regulating the target SIR. In a case that the target SIR needs to be up-regulated, the RNC does not up-regulate the target SIR according to the congestion indication sent by the base station, and sends the target SIR without being up-regulated to the base station. The base station receives the target SIR which is sent by the RNC and is limited to rise.

805: The base station notifies, based on the target SIR sent by the RNC, a UE to limit transmit power.

An SIR is defined as a ratio of transmit power to an interference signal when a UE transmits uplink data. For a certain UE, magnitude of an interference signal generally does not greatly change, and may be approximately considered unchanged. If the target SIR is not up-regulated when being limited by the RNC, the transmit power of the UE does not further rise either, thereby achieving a purpose of limiting the transmit power of the UE and the RTWP of the air interface of the base station. For example, in a WCDMA network, different carriers use a same frequency point, which generates a self-interference phenomenon, namely, for a certain UE, transmit power of another UE is an interference signal of the UE. Numerous UEs exist in the cell, so for a UE, an interference signal generated by another UE is approximately stable. Therefore, a value of an actual SIR of the UE may be limited by limiting the transmit power of the UE.

It should be noted that, the actual SIR of the UE measured by the base station is not strictly equal to the target SIR, but fluctuates around the target SIR and converges at the target SIR. The actual SIR is greater than the target SIR or less than the target SIR, but the target SIR serves as a basis on which the base station adjusts the transmit power of the UE, and still has guiding significance for the actual SIR. When the target SIR is limited to rise, the actual SIR is also limited to rise in a corresponding fluctuation interval, thereby achieving a purpose of limiting the transmit power of the UE.

In another application scenario of the embodiment of the present invention, the base station may further down-regulate the target SIR limited by the RNC to rise. That the RNC limits rise of the target SIR may ensure that the RTWP of the air interface of the base station does not further rise, but because the congestion phenomenon already occurs in the base station, merely limiting the RTWP of the air interface of the base station cannot eliminate the congestion phenomenon of the base station. Therefore, the base station needs to down-regulate the target SIR limited by the RNC to rise, so as to further reduce the target SIR of the UE, and then reduce the transmit power of the UE, thereby reducing the RTWP of the air interface of the base station to a value lower than the first congestion threshold value.

In another application scenario of the embodiment of the present invention, the RNC may be further protected from abnormality. After the air interface of the base station reaches the first congestion threshold value, the RNC is in a state of being forbidden from up-regulating the target SIR. If in a period of time, the RNC does not receive a congestion indication resent by the base station, the limitation of being forbidden from up-regulating the target SIR is automatically removed, and the RNC may up-regulate or down-regulate the target SIR of the UE according to the block error rate, the HARQ retransmission rate or the air interface packet loss rate when the UE uploads the data. The period of time is a ban lifting duration set by the operator according to the actual operating environment. A function of forbidding the RNC from up-regulating the target SIR may limit further rise of the RTWP of the air interface of the base station, but this limitation is at the cost of reducing a data packet transmission success ratio. In an operating procedure, at the same time of ensuring that the RTWP of the air interface of the base station does not exceed the first congestion threshold value, the data packet transmission success ratio needs to be further considered, so the RNC needs to be protected from abnormality.

Much further, in another application scenario of the embodiment of the present invention, in the embodiment of the present invention, a UE on which down-regulation is preferentially performed may be further set according to a user service feature and a user data transmission state, and a second congestion threshold value may be further set. When the RTWP of the air interface of the base station exceeds the second congestion threshold value, power down-regulation is first performed on the UE on which down-regulation is preferentially performed, so as to alleviate the power pressure of the air interface of the base station. Details are as shown in FIG. 6, and on the basis of FIG. 8, the exemplary solution further includes the following steps.

601: A base station sets a UE on which down-regulation is preferentially performed.

A UE on which down-regulation is preferentially performed may be set according to a sensitivity degree to QoS. For example, a voice service in a circuit switched domain is sensitive to QoS, a data packet uploading service in a packet switched domain is insensitive to QoS, and a UE executing a packet switched domain service may be set as a UE on which down-regulation is preferentially performed. The voice service is sensitive to QoS, so excessively small transmit power of the UE causes transient stagnation or even a call drop of a call service, thereby causing a large influence on user experience. When transmit power of a service of uploading a data packet is small, although an uploading stagnation phenomenon also occurs in a procedure of data packet uploading, no excessively large utility cut-down is generated for a user; therefore, comparatively speaking, when transmit power of some UEs needs to be reduced, transmit power of a UE executing a circuit switched domain service needs to be preferentially protected, and transmit power of the UE executing the packet switched domain service may be preferentially down-regulated.

In an application scenario of the embodiment of the present invention, the base station may further set, according to whether a UE is performing data transmission, a UE on which down-regulation is preferentially performed. For example, a UE performing no data transmission may be set as a UE on which down-regulation is preferentially performed. From the perspective of network operation, maintaining transmit power of the UE performing no data transmission is a waste of power of the air interface of the base station, while from the perspective of user utility, in a UE with data transmission and a UE without data transmission, transmit power of the UE with data transmission should be preferentially ensured, so comparatively speaking, when transmit power of some UEs needs to be reduced, the transmit power of the UE with data transmission needs to be preferentially protected, and transmit power of the UE without data transmission may be preferentially down-regulated.

In another application scenario of the embodiment of the present invention, a UE on which down-regulation is preferentially performed may be set by combining the foregoing two setting manners. For example, a UE performing no data transmission is further selected from a UE executing a packet switched domain service, and down-regulation is preferentially performed on the UE. Furthermore, in a power down-regulating procedure, for the UE performing no data transmission, transmit power of the UE may be down-regulated to a power level as long as the power level can ensure transmission quality of a control channel. The foregoing may all be set, adjusted and combined by an operator according to an operating policy in an actual operating environment, which is not limited in the embodiment of the present invention.

602: The base station sets a second congestion threshold value.

The second congestion threshold value is less than the first congestion threshold value. A purpose of setting the second congestion threshold value lies in that, when the RTWP of the air interface of the base station reaches the second congestion threshold value but has not reached the first congestion threshold value yet, transmit power of a part of UEs is down-regulated in advance, so as to alleviate a part of power pressure of the air interface of the base station before the RTWP of the air interface of the base station reaches the first congestion threshold value. The part of UEs is the UE on which down-regulation is preferentially performed set in step 601.

603: When the RTWP of the air interface of the base station exceeds the second congestion threshold value, the base station down-regulates transmit power of the UE on which down-regulation is preferentially performed.

The down-regulating the transmit power includes the following steps:

(1) the base station receives a target SIR of the UE on which down-regulation is preferentially performed that is sent by the RNC;

(2) the base station down-regulates the target SIR of the UE on which down-regulation is preferentially performed that is sent by the RNC; and (3) the base station notifies, based on the down-regulated target SIR of the UE on which down-regulation is preferentially performed, the UE on which down-regulation is preferentially performed to reduce transmit power.

Execution procedures of step (1), step (2) and step (3) may correspond to step 504, step 505 and step 506 in FIG. 5 respectively, reference may be made to implementation of step 504, step 505 and step 506 in FIG. 5, and details are not repeatedly described herein.

In the power control method provided in the embodiment of the present invention, rise of a target SIR of a UE can be limited in a case of power congestion of an air interface of a base station, which avoids congestion pressure formed by further rise of transmit power of the UE on already excessively high RTWP of the air interface of the base station.

Furthermore, in an application scenario of the embodiment of the present invention, a value of the target SIR which is already limited to rise can also be down-regulated, so as to reduce the transmit power of the UE. A problem of power congestion of the air interface of the base station is solved, a state of a system is stabilized, and service quality of an edge user and a QoS-sensitive user is ensured.

Furthermore, in an application scenario of the embodiment of the present invention, before the RTWP of the air interface of the base station reaches the first congestion threshold value, transmit power of a part of UEs executing a QoS-insensitive service and/or performing no data transmission in the cell can be further preferentially down-regulated. These UEs having a small influence on the user utility make more contribution to down-regulation of the RTWP of the air interface of the base station, transmit power of a UE executing a QoS-sensitive service is further ensured or increased at the same time, and in a case of reducing the RTWP of the air interface of the base station, it is ensured that the service quality of the QoS-sensitive user is not affected by the down-regulation of the RTWP of the air interface of the base station.

Furthermore, in an application scenario of the embodiment of the present invention, abnormality protection can be further set for the RNC, and while it is ensured that the RTWP of the air interface of the base station does not exceed the first congestion threshold value, the data packet transmission success ratio can be further considered at the same time.

Embodiment 7

Figure 9:
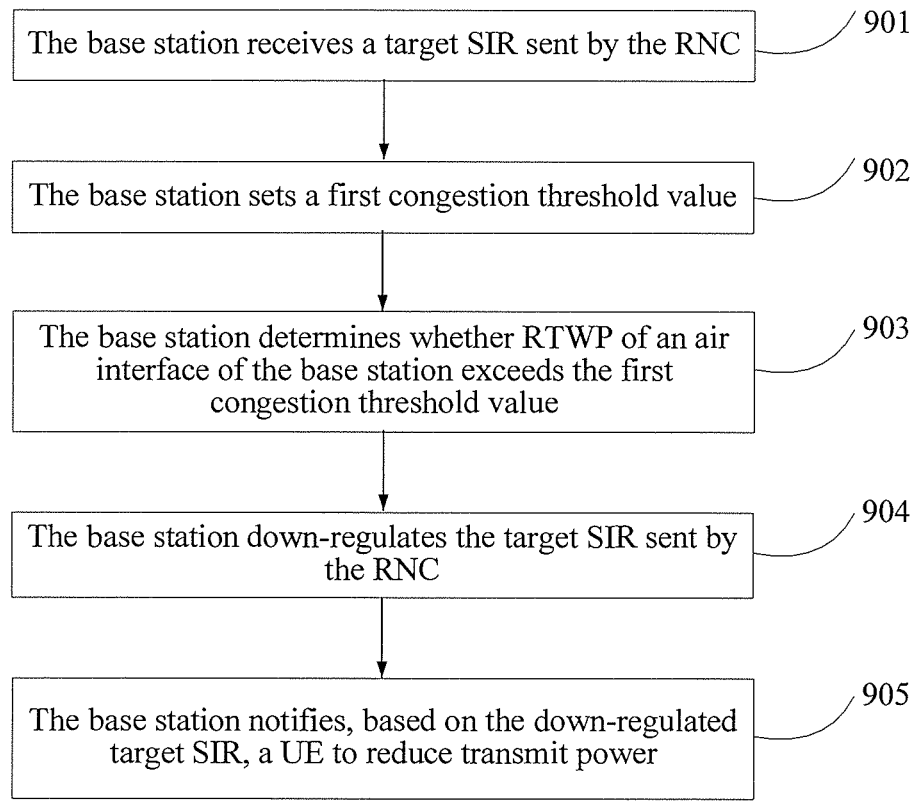
FIG. 9 is a flow chart of a power control method according to Embodiment 7 of the present invention.

The embodiment of the present invention provides a power control method. As shown in FIG. 9, the method includes the following steps.

901: A base station receives a target SIR sent by an RNC.

902: The base station sets a first congestion threshold value.

The first congestion threshold value may be set by an operator according to a current network condition in an actual operating environment, different first congestion threshold values may also be set for cells with different current network conditions, and meanwhile, different first congestion threshold values may also be set for a cell according to different current network conditions of the same cell in different periods of time, which is not limited in the embodiment of the present invention.

903: The base station determines whether RTWP of an air interface of the base station exceeds the first congestion threshold value.

The RTWP of the air interface is a sum of transmit power of all UEs pertaining to the base station. When the RTWP of the air interface exceeds the first congestion threshold value, a congestion phenomenon occurs in the base station, a state of the cell is unstable, and coverage quality of an edge user declines. Particularly for a service sensitive to QoS, such as voice service, a phenomenon, such as transient call stagnation or a voice delay, is generated easily, and a call drop phenomenon is further generated in a serious case, thereby affecting service experience of a user. Therefore, when the RTWP of the air interface of the base station exceeds the first congestion threshold value, the RTWP on the air interface of the base station needs to be down-regulated.

904: The base station down-regulates the target SIR sent by the RNC.

The base station down-regulates the target SIR sent by the RNC, so as to reduce the target SIR of the UE, and further reduce the transmit power of the UE, thereby reducing the RTWP of the air interface of the base station to a value lower than the first congestion threshold value.

In an application scenario of the embodiment of the present invention, the base station may periodically and evenly down-regulate the target SIR. For example, the target SIR may be down-regulated by 0.2 dB every 10 ms, and setting of a period length and a down-regulation extent in a period are not limited in the embodiment of the present invention.

In another application scenario of the embodiment of the present invention, the base station may further shorten a down-regulation period, and the target SIR of the UE is down-regulated through a fast small-step period, so as to strengthen a down-regulation effect. A period during which the RNC adjusts the target SIR of the UE in a manner of outer loop power control is long, so shortening of the period during which the RNC adjusts the target SIR of the UE easily causes a traffic impact on an interface between the RNC and the base station. Therefore, down-regulation of a small step period may be performed on the target SIR of the UE through the base station itself.

Further, in an application scenario of the embodiment of the present invention, when determining that the RTWP of the air interface of the base station exceeds the first congestion threshold value, the base station may further send a congestion indication to the RNC. After receiving the congestion indication, the RNC limits further rise of the target SIR, and therefore, further aggravation of power pressure of the air interface of the base station may be avoided.

After receiving the target SIR which is sent by the RNC and is limited to rise, the base station down-regulates the target SIR limited to rise, and down-regulates the RTWP of the air interface of the base station to a value lower than the first congestion threshold value.

Further, in another application scenario of the embodiment of the present invention, before down-regulating the target SIR sent by the RNC, the base station may further stop uplink packet scheduling. Compared with a circuit switched domain service, QoS sensitivity of a packet switched domain service is low, and when the RTWP of the air interface of the base station exceeds the first congestion threshold value, a packet switched domain may be preferentially stopped from continuously uploading a large data packet, so as to alleviate the power pressure of the air interface of the base station. For example, a larger data packet of the user may be temporarily stopped from being uploaded, and from the perspective of a user plane, in a case that transmission time for uploading service data is long, waiting time added by short-time uplink stop of a large data packet cuts down marginal utility of the user, and the cut-down does not cause more influence on user experience.

905: The base station notifies, based on the down-regulated target SIR, a UE to reduce transmit power.

An SIR is defined as a ratio of transmit power to an interference signal when a UE transmits uplink data. For a certain UE, magnitude of an interference signal generally does not greatly change, and may be approximately considered unchanged. When the target SIR is reduced through down-regulation of the base station, an actual SIR of the UE for uploading data can be reduced to the target SIR only if the transmit power of the UE is reduced, thereby achieving a purpose of reducing the transmit power of the UE and reducing the RTWP of the air interface of the base station. For example, in a WCDMA network, different carriers use a same frequency point, which generates a self-interference phenomenon, namely, for a certain UE, transmit power of another UE is an interference signal of the UE. Numerous UEs exist in the cell, so for a UE, an interference signal generated by another UE is approximately stable. Therefore, a value of an actual SIR of the UE may be reduced by reducing the transmit power of the UE.

In an application scenario of the embodiment of the present invention, the base station may perform down-regulation on the transmit power of the UE according to the target SIR on a granularity of a time slot grade, thereby further improving fineness and real time performance of controlling the RTWP of the air interface of the base station.

It should be noted that, the actual SIR of the UE measured by the base station is not strictly equal to the target SIR, but fluctuates around the target SIR and converges at the target SIR. The actual SIR is greater than the target SIR or less than the target SIR, but the target SIR serves as a basis on which the base station adjusts the transmit power of the UE, and still has guiding significance for the actual SIR. When the target SIR declines, the actual SIR also declines in a corresponding fluctuation interval, thereby achieving a purpose of reducing the transmit power of the UE.

In another application scenario of the embodiment of the present invention, the RNC may be further protected from abnormality. After the air interface of the base station reaches the first congestion threshold value, the RNC is in a state of being forbidden from up-regulating the target SIR.

If in a period of time, the RNC does not receive a congestion indication resent by the base station, the limitation of being forbidden from up-regulating the target SIR is automatically removed, and the RNC may up-regulate or down-regulate the target SIR of the UE according to the block error rate, the HARQ retransmission rate or the air interface packet loss rate when the UE uploads the data. The period of time is a ban lifting duration set by the operator according to the actual operating environment. A function of forbidding the RNC from up-regulating the target SIR may limit further rise of the RTWP of the air interface of the base station, but this limitation is at the cost of reducing a data packet transmission success ratio. In an operating procedure, at the same time of ensuring that the RTWP of the air interface of the base station does not exceed the first congestion threshold value, the data packet transmission success ratio needs to be further considered, so the RNC needs to be protected from abnormality.

Further, in another application scenario of the embodiment of the present invention, when the RTWP of the air interface of the base station declines to a value lower than the first congestion threshold value, the base station may up-regulate the target SIR sent by the RNC. A purpose of up-regulating the target SIR lies in that, after the power pressure of the air interface of the base station is alleviated, the transmit power of the UE is up-regulated in a manner of up-regulating the target SIR, so as to improve a success ratio at which the UE sends a data packet. The base station steadily up-regulates the target SIR with a small step, and that the target SIR to be up-regulated does not exceed a target SIR when the RTWP of the base station is equal to the first congestion threshold value is taken as a limitation, thereby improving the success ratio at which the UE sends a data packet as much as possible and ensuring quality of a user service in a case that the RTWP of the air interface of the base station does not exceed the first congestion threshold value again. It should be noted that, the actual SIR of the UE for sending the data packet fluctuates around the target SIR and converges at the target SIR, so a case that an up-regulated target SIR does not exceed the target SIR when the RTWP of the base station is equal to the first congestion threshold value, but an increased RTWP of the air interface of the base station again exceeds the first congestion threshold value occurs. In this case, step 904 and step 905 are repetitively executed, the RTWP of the air interface of the base station is down-regulated again, and for a specific procedure, reference may be made to the implementation of step 904 to step 905 in FIG. 9, and details are not repeatedly described herein.

Much further, in another application scenario of the embodiment of the present invention, in the embodiment of the present invention, a UE on which down-regulation is preferentially performed may be further set according to a user service feature and a user data transmission state, and a second congestion threshold value may be further set. When the RTWP of the air interface of the base station exceeds the second congestion threshold value, power down-regulation is first performed on the UE on which down-regulation is preferentially performed, so as to alleviate the power pressure of the air interface of the base station. Details are as shown in FIG. 6, and on the basis of FIG. 9, the exemplary solution further includes the following steps.

601: A base station sets a UE on which down-regulation is preferentially performed.

A UE on which down-regulation is preferentially performed may be set according to a sensitivity degree to QoS. For example, a voice service in a circuit switched domain is sensitive to QoS, a data packet uploading service in a packet switched domain is insensitive to QoS, and a UE executing a packet switched domain service may be set as a UE on which down-regulation is preferentially performed. The voice service is sensitive to QoS, so excessively small transmit power of the UE causes transient stagnation or even a call drop of a call service, thereby causing a large influence on user experience. When transmit power of a service of uploading a data packet is small, although an uploading stagnation phenomenon also occurs in a procedure of data packet uploading, no excessively large utility cut-down is generated for a user; therefore, comparatively speaking, when transmit power of some UEs needs to be reduced, transmit power of a UE executing a circuit switched domain service needs to be preferentially protected, and transmit power of the UE executing the packet switched domain service may be preferentially down-regulated.

In an application scenario of the embodiment of the present invention, the base station may further set, according to whether a UE is performing data transmission, a UE on which down-regulation is preferentially performed. For example, a UE performing no data transmission may be set as a UE on which down-regulation is preferentially performed. From the perspective of network operation, maintaining transmit power of the UE performing no data transmission is a waste of power of the air interface of the base station, while from the perspective of user utility, in a UE with data transmission and a UE without data transmission, transmit power of the UE with data transmission should be preferentially ensured, so comparatively speaking, when transmit power of some UEs needs to be reduced, the transmit power of the UE with data transmission needs to be preferentially protected, and transmit power of the UE without data transmission may be preferentially down-regulated.

In another application scenario of the embodiment of the present invention, a UE on which down-regulation is preferentially performed may be set by combining the foregoing two setting manners. For example, a UE performing no data transmission is further selected from a UE executing a packet switched domain service, and down-regulation is preferentially performed on the UE. Furthermore, in a power down-regulating procedure, for the UE performing no data transmission, transmit power of the UE may be down-regulated to a power level as long as the power level can ensure transmission quality of a control channel. The foregoing may all be set, adjusted and combined by an operator according to an operating policy in an actual operating environment, which is not limited in the embodiment of the present invention.

602: The base station sets a second congestion threshold value.

The second congestion threshold value is less than the first congestion threshold value. A purpose of setting the second congestion threshold value lies in that, when the RTWP of the air interface of the base station reaches the second congestion threshold value but has not reached the first congestion threshold value yet, transmit power of a part of UEs is down-regulated in advance, so as to alleviate a part of power pressure of the air interface of the base station before the RTWP of the air interface of the base station reaches the first congestion threshold value. The part of UEs is the UE on which down-regulation is preferentially performed set in step 601.

603: When the RTWP of the air interface of the base station exceeds the second congestion threshold value, the base station down-regulates transmit power of the UE on which down-regulation is preferentially performed.

The down-regulating the transmit power includes the following steps:

(1) the base station receives a target SIR of the UE on which down-regulation is preferentially performed that is sent by the RNC;

(2) the base station down-regulates the target SIR of the UE on which down-regulation is preferentially performed that is sent by the RNC; and (3) the base station notifies, based on the down-regulated target SIR of the UE on which down-regulation is preferentially performed, the UE on which down-regulation is preferentially performed to reduce transmit power.

Execution procedures of step (1), step (2) and step (3) may correspond to step 504, step 505 and step 506 in FIG. 5 respectively, reference may be made to implementation of step 504, step 505 and step 506 in FIG. 5, and details are not repeatedly described herein.

In the power control method provided in the embodiment of the present invention, a value of the target SIR sent by the RNC can be down-regulated, so as to reduce the transmit power of the UE. A problem of power congestion of the air interface of the base station is solved, a state of a system is stabilized, and service quality of an edge user and a QoS-sensitive user is ensured.

Furthermore, in an application scenario of the embodiment of the present invention, rise of a target SIR of a UE can be limited in a case of power congestion of an air interface of a base station, which avoids congestion pressure formed by further rise of transmit power of the UE on already excessively high RTWP of the air interface of the base station.

Furthermore, in an application scenario of the embodiment of the present invention, before the RTWP of the air interface of the base station reaches the first congestion threshold value, transmit power of a part of UEs executing a QoS-insensitive service and/or performing no data transmission in the cell can be further preferentially down-regulated. These UEs having a small influence on the user utility make more contribution to down-regulation of the RTWP of the air interface of the base station, transmit power of a UE executing a QoS-sensitive service is further ensured or increased at the same time, and in a case of reducing the RTWP of the air interface of the base station, it is ensured that the service quality of the QoS-sensitive user is not affected by the down-regulation of the RTWP of the air interface of the base station.

Furthermore, in an application scenario of the embodiment of the present invention, abnormality protection can be further set for the RNC, and while it is ensured that the RTWP of the air interface of the base station does not exceed the first congestion threshold value, the data packet transmission success ratio can be further considered at the same time.

Embodiment 8

Figure 10:
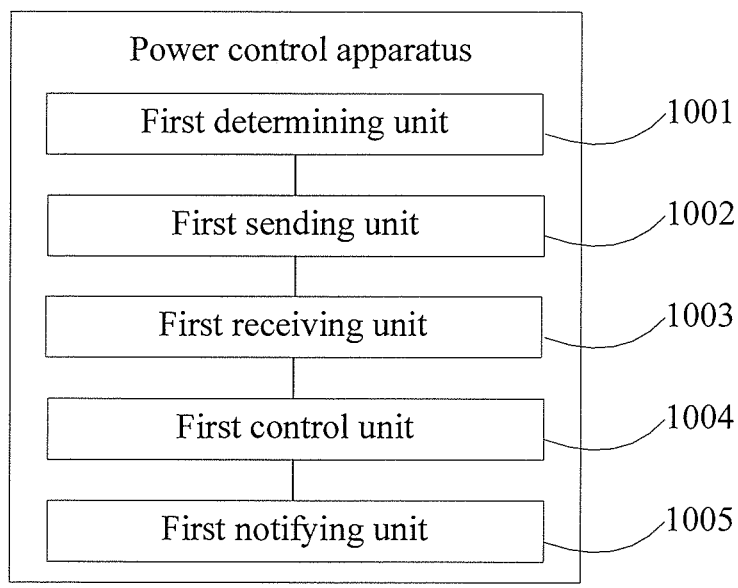
FIG. 10 is a schematic structural diagram of a power control apparatus according to Embodiment 8 of the present invention.

With reference to implementation of the foregoing method embodiments, the embodiment of the present invention provides a power control apparatus, which may be configured to implement the foregoing method embodiments of the present invention. As shown in FIG. 10, the apparatus includes: a first determining unit 1001, a first sending unit 1002, a first receiving unit 1003, a first control unit 1004 and a first notifying unit 1005.

The first determining unit 1001 may be configured to execute step 502 in method Embodiment 5, namely, determine whether RTWP of an air interface of a base station exceeds a first congestion threshold value.

The RTWP of the air interface is a sum of transmit power of all UEs pertaining to the base station. When the RTWP of the air interface exceeds the first congestion threshold value, a congestion phenomenon occurs in the base station, a state of the cell is unstable, and coverage quality of an edge user declines. Particularly for a service sensitive to QoS, such as voice service, a phenomenon, such as transient call stagnation or a voice delay, is generated easily, and a call drop phenomenon is further generated in a serious case, thereby affecting service experience of a user. Therefore, when the RTWP of the air interface of the base station exceeds the first congestion threshold value, the RTWP on the air interface of the base station needs to be limited.

The first sending unit 1002 may be configured to execute step 503 in method Embodiment 5, namely, when the first determining unit 1001 determines that the RTWP of the air interface of the base station exceeds the first congestion threshold value, send a congestion indication to an RNC.

The congestion indication is used for indicating that the RNC is forbidden from up-regulating a target SIR. The RNC may adjust a target SIR of a UE according to a block error rate, an HARQ retransmission rate or an air interface packet loss rate when the UE uploads data. Taking the block error rate as an example: If the block error rate is high when the UE uploads data, the RNC up-regulates the target SIR of the UE, so as to increase transmit power of the UE, thereby reducing the block error rate; if the block error rate is small when the UE uploads data, in order to save transmit power of uplink data, the RNC down-regulates the target SIR of the UE, so as to reduce the transmit power of the UE. When congestion occurs in the air interface of the base station, in order to ensure whole stability of the network, even if the block error rate is high when the UE uploads data, the RNC is not allowed to up-regulate the target SIR of the UE, thereby ensuring that the RTWP of the air interface of the base station does not further rise.

It should be noted that, after the first sending unit 1002 sends the congestion indication to the RNC, the RNC is forbidden from up-regulating the target SIR of the UE, but if the block error rate is small when the UE uploads data, the RNC may down-regulate the target SIR of the UE. Down-regulation of the target SIR of the UE does not further increase the RTWP of the air interface of the base station, while instead, further reduces the RTWP of the air interface of the base station, so a function of down-regulating the target SIR of the UE by the RNC is not limited.

The first receiving unit 1003 may be configured to execute step 504 in method Embodiment 5, namely, receive a target SIR sent by the RNC.

When the RTWP of the air interface of the base station exceeds the first congestion threshold value, the first sending unit 1002 sends a congestion indication to the RNC, indicating that the RNC is forbidden from up-regulating the target SIR. In a case that the target SIR needs to be up-regulated, the RNC does not up-regulate the target SIR according to the congestion indication sent by the first sending unit 1002, and sends the target SIR without being up-regulated to the first receiving unit 1003.

The first control unit 1004 may be configured to execute step 505 in method Embodiment 5, namely, down-regulate the target SIR sent by the RNC and received by the first receiving unit 1003.

The first control unit 1004 down-regulates the target SIR limited by the RNC to rise. That the RNC limits rise of the target SIR can only ensure that the RTWP of the air interface of the base station does not further rise, but because the congestion phenomenon already occurs in the base station, merely limiting the RTWP of the air interface of the base station cannot eliminate the congestion phenomenon of the base station. Therefore, the first control unit 1004 needs to down-regulate the target SIR limited by the RNC to rise, so as to further reduce the target SIR of the UE, and then reduce the transmit power of the UE, thereby reducing the RTWP of the air interface of the base station to a value lower than the first congestion threshold value.

The first notifying unit 1005 may be configured to execute step 506 in method Embodiment 5, namely, notify, based on the target SIR down-regulated by the first control unit 1004, a UE to reduce the transmit power.

An SIR is defined as a ratio of transmit power to an interference signal when a UE transmits uplink data. For a certain UE, magnitude of an interference signal generally does not greatly change, and may be approximately considered unchanged. When the target SIR is reduced through down-regulation of the base station, an actual SIR of the UE for uploading data can be reduced to the target SIR only if the transmit power of the UE is reduced, thereby achieving a purpose of reducing the transmit power of the UE and reducing the RTWP of the air interface of the base station. For example, in a WCDMA network, different carriers use a same frequency point, which generates a self-interference phenomenon, namely, for a certain UE, transmit power of another UE is an interference signal of the UE. Numerous UEs exist in the cell, so for a UE, an interference signal generated by another UE is approximately stable. Therefore, a value of an actual SIR of the UE may be reduced by reducing the transmit power of the UE.

Figure 11:
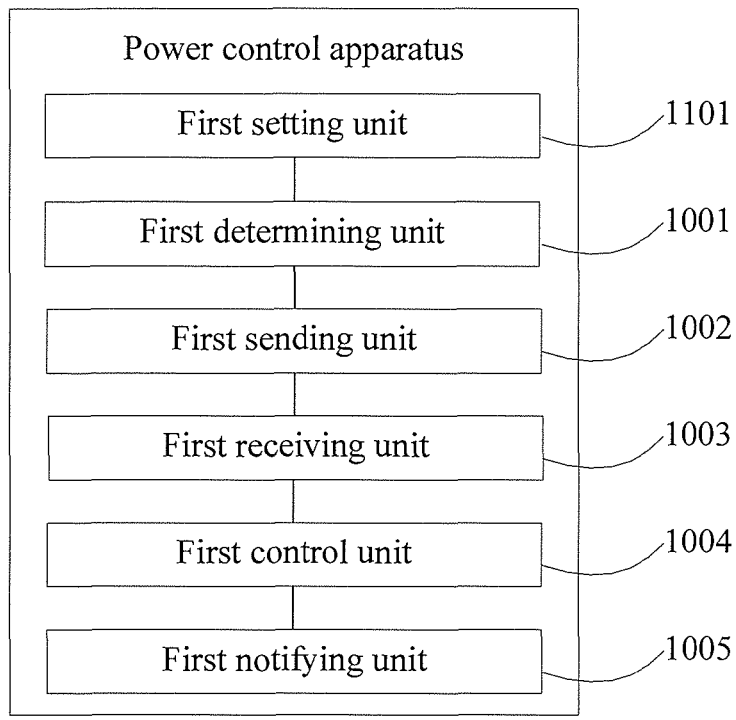
FIG. 11 is a schematic structural diagram of the power control apparatus according to Embodiment 8 of the present invention.

In an application scenario of the embodiment of the present invention, as shown in FIG. 11, the apparatus further includes:

a first setting unit 1101, which may be configured to execute step 601 in method Embodiment 5, namely, set a UE executing a packet switched domain service as a UE on which down-regulation is preferentially performed.

The first setting unit 1101 may be further configured to execute step 601 in method Embodiment 5, namely, before the first determining unit 1001 determines whether the RTWP of the air interface of the base station exceeds the first congestion threshold value, set a UE without data transmission as a UE on which down-regulation is preferentially performed.

The first setting unit 1101 may set a UE on which down-regulation is preferentially performed according to a sensitivity degree to QoS. For example, a voice service in a circuit switched domain is sensitive to QoS, a data packet uploading service in a packet switched domain is insensitive to QoS, and a UE executing a packet switched domain service may be set as a UE on which down-regulation is preferentially performed. The voice service is sensitive to QoS, so excessively small transmit power of the UE causes transient stagnation or even a call drop of a call service, thereby causing a large influence on user experience. When transmit power of a service of uploading a data packet is small, although an uploading stagnation phenomenon also occurs in a procedure of data packet uploading, no excessively large utility cut-down is generated for a user; therefore, comparatively speaking, when transmit power of some UEs needs to be reduced, transmit power of a UE executing a circuit switched domain service needs to be preferentially protected, and transmit power of the UE executing the packet switched domain service may be preferentially down-regulated.

In an application scenario of the embodiment of the present invention, the first setting unit 1101 may further set, according to whether a UE is performing data transmission, a UE on which down-regulation is preferentially performed. For example, a UE performing no data transmission may be set as a UE on which down-regulation is preferentially performed. From the perspective of network operation, maintaining transmit power of the UE performing no data transmission is a waste of power of the air interface of the base station, while from the perspective of user utility, in a UE with data transmission and a UE without data transmission, transmit power of the UE with data transmission should be preferentially ensured, so comparatively speaking, when transmit power of some UEs needs to be reduced, the transmit power of the UE with data transmission needs to be preferentially protected, and transmit power of the UE without data transmission may be preferentially down-regulated.

In an application scenario of the embodiment of the present invention, the first setting unit 1101 may set, by combining the foregoing two setting manners, a UE on which down-regulation is preferentially performed. For example, a UE performing no data transmission is further selected from a UE executing a packet switched domain service, and down-regulation is preferentially performed on the UE. Furthermore, in a power down-regulating procedure, for the UE performing no data transmission, transmit power of the UE may be down-regulated to a power level as long as the power level can ensure transmission quality of a control channel. The foregoing may all be set, adjusted and combined by an operator according to an operating policy in an actual operating environment, which is not limited in the embodiment of the present invention.

Figure 12:
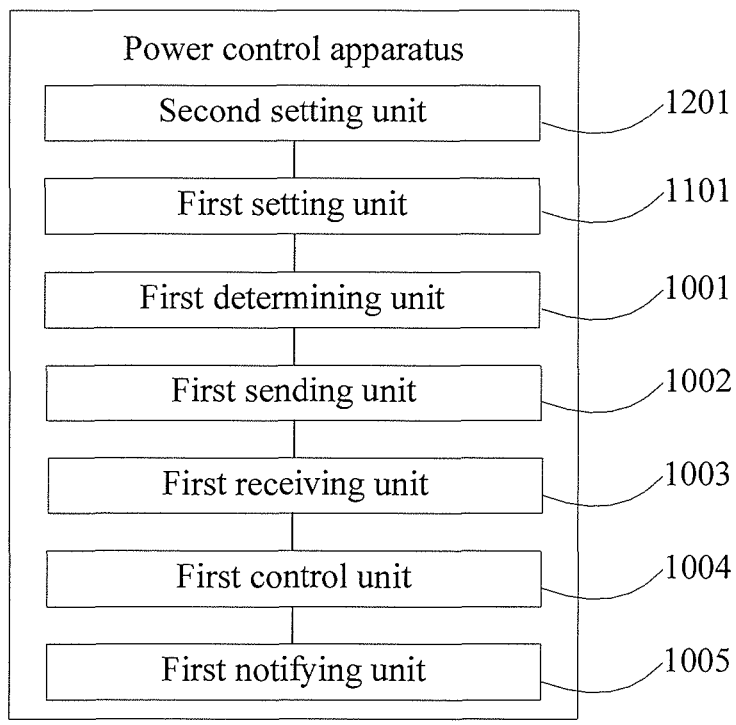
FIG. 12 is a schematic structural diagram of the power control apparatus according to Embodiment 8 of the present invention.

In an application scenario of the embodiment of the present invention, as shown in FIG. 12, the apparatus further includes:

a second setting unit 1201, which may be configured to execute step 602 in method Embodiment 5, namely, set a second congestion threshold value.

The second congestion threshold value is less than the first congestion threshold value. A purpose of setting the second congestion threshold value by the second setting unit 1201 lies in that, when the RTWP of the air interface of the base station reaches the second congestion threshold value but has not reached the first congestion threshold value yet, transmit power of a part of UEs is down-regulated in advance, so as to alleviate a part of power pressure of the air interface of the base station before the RTWP of the air interface of the base station reaches the first congestion threshold value. The part of UEs is the UE on which down-regulation is preferentially performed set by the first setting unit 1101.

The first determining unit 1001 may be further configured to determine whether the RTWP of the air interface of the base station exceeds the second congestion threshold value set by the second setting unit 1201.

In an application scenario of the embodiment of the present invention, when the RTWP of the air interface of the base station exceeds the second congestion threshold value:

the first receiving unit 1003 may be further configured to execute step 603 in method Embodiment 5, namely, receive a target SIR of the UE on which down-regulation is preferentially performed that is sent by the RNC;

the first control unit 1004 may be further configured to execute step 603 in method Embodiment 5, namely, down-regulate the target SIR of the UE on which down-regulation is preferentially performed that is sent by the RNC and received by the first receiving unit 1003; and the first notifying unit 1005 may be further configured to execute step 603 in method Embodiment 5, namely, notify, based on the target SIR down-regulated by the first control unit 1004, the UE on which down-regulation is preferentially performed to reduce transmit power.

Figure 13:
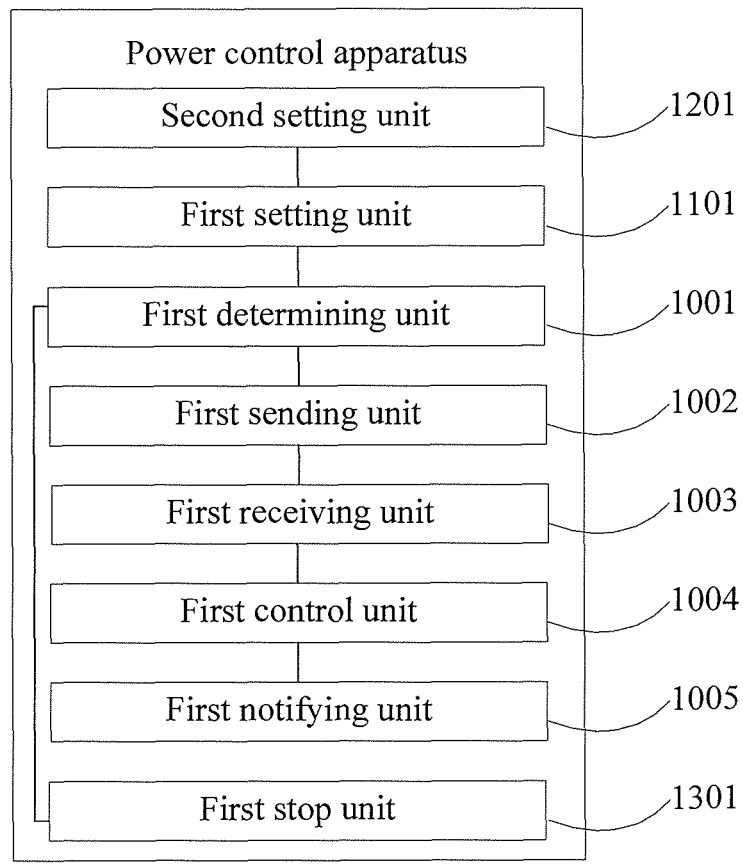
FIG. 13 is a schematic structural diagram of the power control apparatus according to Embodiment 8 of the present invention.

In an application scenario of the embodiment of the present invention, as shown in FIG. 13, the apparatus further includes:

a first stop unit 1301, which may be configured to stop uplink packet scheduling.

Compared with a circuit switched domain service, QoS sensitivity of a packet switched domain service is low, and when the RTWP of the air interface of the base station exceeds the first congestion threshold value, the first stop unit 1301 may preferentially stop a packet switched domain from continuously uploading a large data packet, so as to alleviate power pressure of the air interface of the base station. For example, a larger data packet of the user may be temporarily stopped from being uploaded, and from the perspective of a user plane, in a case that transmission time for uploading service data is long, waiting time added by short-time uplink stop of a large data packet cuts down marginal utility of the user, and the cut-down does not cause more influence on user experience.

In an application scenario of the embodiment of the present invention, the first control unit 1004 may be further configured to: when the RTWP of the air interface of the base station is less than the first congestion threshold value, up-regulate the target SIR sent by the RNC, where the up-regulated target SIR is not greater than the target SIR sent by the RNC when the RTWP of the air interface of the base station exceeds the first congestion threshold value.

When the RTWP of the air interface of the base station declines to a value lower than the first congestion threshold value, the first control unit 1004 may up-regulate the target SIR sent by the RNC. A purpose of up-regulating the target SIR lies in that, after the power pressure of the air interface of the base station is alleviated, the transmit power of the UE is up-regulated in a manner of up-regulating the target SIR, so as to improve a success ratio at which the UE sends a data packet. The first control unit 1004 steadily up-regulates the target SIR with a small step, and that the target SIR to be up-regulated does not exceed the target SIR sent by the RNC and received by the first receiving unit 1003 is taken as a limitation, thereby improving the success ratio at which the UE sends a data packet as much as possible and ensuring quality of a user service in a case that the RTWP of the air interface of the base station does not exceed the first congestion threshold value again.

In an actual application, the apparatus in the embodiment of the present invention may be, but is not limited to, a base station (Node B, NB), an evolved base station (evolved Node B, eNB) or an access point (Access Point, AP), which is not limited in the embodiment of the present invention.

In the power control apparatus provided in the embodiment of the present invention, rise of a target SIR of a UE can be limited in a case of power congestion of an air interface of a base station, which avoids congestion pressure formed by further rise of transmit power of the UE on already excessively high RTWP of the air interface of the base station. Meanwhile, in an application scenario of the embodiment of the present invention, a value of the target SIR which is already limited to rise can also be down-regulated, so as to reduce the transmit power of the UE. A problem of power congestion of the air interface of the base station is solved, a state of a system is stabilized, and service quality of an edge user and a QoS-sensitive user is ensured.

Furthermore, in an application scenario of the embodiment of the present invention, the power control apparatus provided in the embodiment of the present invention is further capable of: before the RTWP of the air interface of the base station reaches the first congestion threshold value, preferentially down-regulating transmit power of a part of UEs executing a QoS-insensitive service and/or performing no data transmission in the cell. These UEs having a small influence on the user utility make more contribution to down-regulation of the RTWP of the air interface of the base station, transmit power of a UE executing a QoS-sensitive service is further ensured or increased at the same time, and in a case of reducing the RTWP of the air interface of the base station, it is ensured that the service quality of the QoS-sensitive user is not affected by the decline of the RTWP of the air interface of the base station.

Embodiment 9

Figure 14:
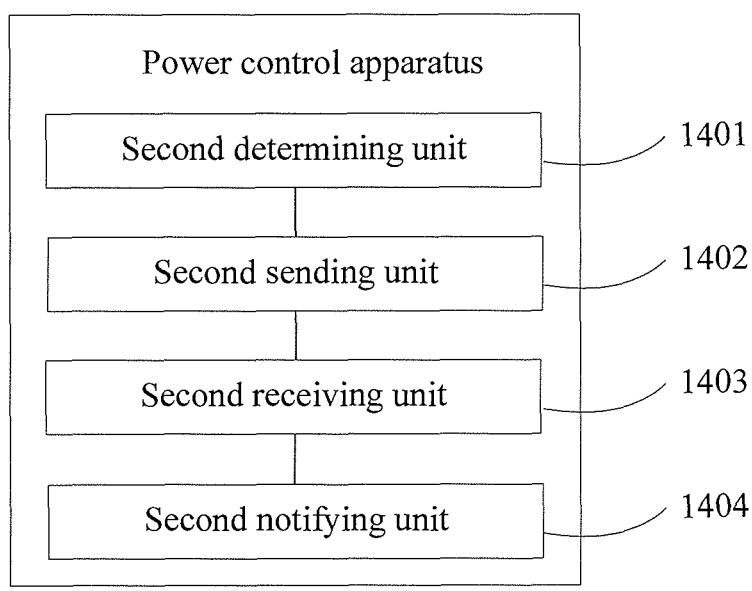
FIG. 14 is a schematic structural diagram of a power control apparatus according to Embodiment 9 of the present invention.

With reference to implementation of the foregoing method embodiments, the embodiment of the present invention provides a power control apparatus, which may be configured to implement the foregoing method embodiments of the present invention. As shown in FIG. 14, the apparatus includes: a second determining unit 1401, a second sending unit 1402, a second receiving unit 1403 and a second notifying unit 1404.

The second determining unit 1401 may be configured to execute step 802 in method Embodiment 6, namely, determine whether RTWP of an air interface of a base station exceeds a first congestion threshold value.

The RTWP of the air interface is a sum of transmit power of all UEs pertaining to the base station. When the RTWP of the air interface exceeds the first congestion threshold value, a congestion phenomenon occurs in the base station, a state of the cell is unstable, and coverage quality of an edge user declines. Particularly for a service sensitive to QoS, such as voice service, a phenomenon, such as transient call stagnation or a voice delay, is generated easily, and a call drop phenomenon is further generated in a serious case, thereby affecting service experience of a user. Therefore, when the RTWP of the air interface of the base station exceeds the first congestion threshold value, the RTWP on the air interface of the base station needs to be limited.

The second sending unit 1402 may be configured to execute step 803 in method Embodiment 6, namely, when the second determining unit 1401 determines that the RTWP of the air interface of the base station exceeds the first congestion threshold value, send a congestion indication to an RNC.

The congestion indication is used for indicating that the RNC is forbidden from up-regulating a target SIR. The RNC may adjust a target SIR of a UE according to a block error rate, an HARQ retransmission rate or an air interface packet loss rate when the UE uploads data. Taking the block error rate as an example: If the block error rate is high when the UE uploads data, the RNC up-regulates the target SIR of the UE, so as to increase transmit power of the UE, thereby reducing the block error rate; if the block error rate is small when the UE uploads data, in order to save transmit power of uplink data, the RNC down-regulates the target SIR of the UE, so as to reduce the transmit power of the UE. When congestion occurs in the air interface of the base station, in order to ensure whole stability of the network, even if the block error rate is high when the UE uploads data, the RNC is not allowed to up-regulate the target SIR of the UE, thereby ensuring that the RTWP of the air interface of the base station does not further rise.

It should be noted that, after the second sending unit 1402 sends the congestion indication to the RNC, the RNC is forbidden from up-regulating the target SIR of the UE, but if the block error rate is small when the UE uploads data, the RNC may down-regulate the target SIR of the UE. Down-regulation of the target SIR of the UE does not further increase the RTWP of the air interface of the base station, while instead, further reduces the RTWP of the air interface of the base station, so a function of down-regulating the target SIR of the UE by the RNC is not limited.

The second receiving unit 1403 may be configured to execute step 804 in method Embodiment 6, namely, receive a target SIR sent by the RNC.

When the RTWP of the air interface of the base station exceeds the first congestion threshold value, the second sending unit 1402 sends a congestion indication to the RNC, indicating that the RNC is forbidden from up-regulating the target SIR. In a case that the target SIR needs to be up-regulated, the RNC does not up-regulate the target SIR according to the congestion indication sent by the second sending unit 1402, and sends the target SIR without being up-regulated to the second receiving unit 1403.

The second notifying unit 1404 may be configured to execute step 805 in method Embodiment 6, namely, notify, according to the target SIR sent by the RNC and received by the second receiving unit 1403, a UE to limit transmit power.

An SIR is defined as a ratio of transmit power to an interference signal when a UE transmits uplink data. For a certain UE, magnitude of an interference signal generally does not greatly change, and may be approximately considered unchanged. If the target SIR is not up-regulated when being limited by the RNC, the transmit power of the UE does not further rise either, thereby achieving a purpose of limiting the transmit power of the UE and the RTWP of the air interface of the base station. For example, in a WCDMA network, different carriers use a same frequency point, which generates a self-interference phenomenon, namely, for a certain UE, transmit power of another UE is an interference signal of the UE. Numerous UEs exist in the cell, so for a UE, an interference signal generated by another UE is approximately stable. Therefore, a value of an actual SIR of the UE may be limited by limiting the transmit power of the UE.

Figure 15:
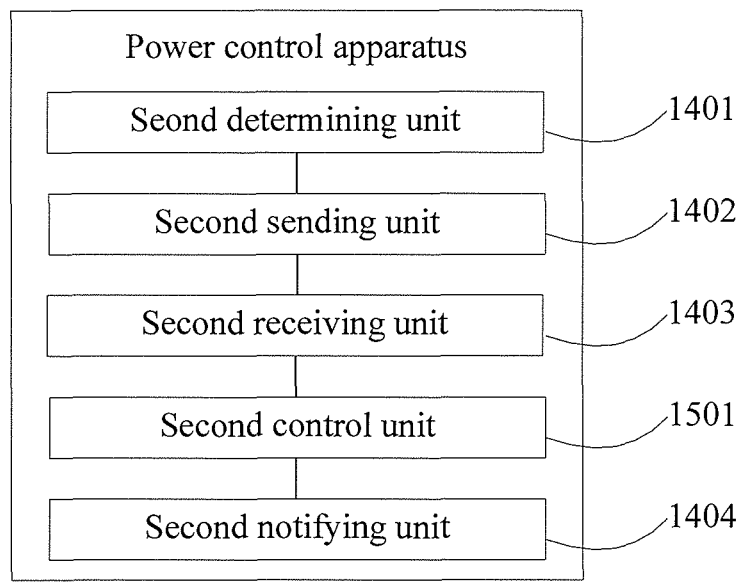
FIG. 15 is a schematic structural diagram of the power control apparatus according to Embodiment 9 of the present invention.

In an application scenario of the embodiment of the present invention, as shown in FIG. 15, the apparatus further includes:

a second control unit 1501, which may be configured to execute step 505 in method Embodiment 5, namely, down-regulate the target SIR sent by the RNC and received by the second receiving unit 1403.

The second control unit 1501 down-regulates the target SIR limited by the RNC to rise. That the RNC limits rise of the target SIR can only ensure that the RTWP of the air interface of the base station does not further rise, but because the congestion phenomenon already occurs in the base station, merely limiting the RTWP of the air interface of the base station cannot eliminate the congestion phenomenon of the base station. Therefore, the second control unit 1501 needs to down-regulate the target SIR limited by the RNC to rise, so as to further reduce the target SIR of the UE, and then reduce the transmit power of the UE, thereby reducing the RTWP of the air interface of the base station to a value lower than the first congestion threshold value.

Figure 16:
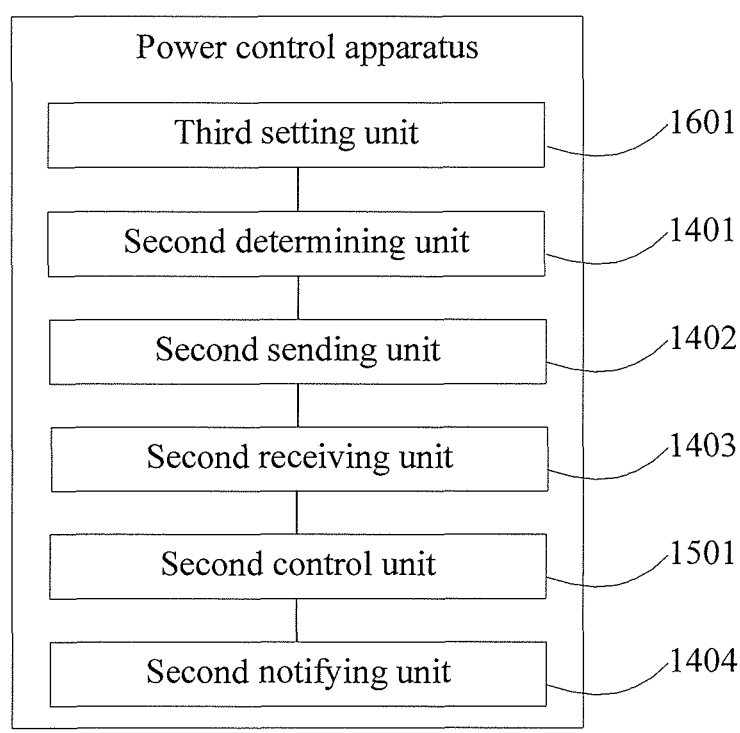
FIG. 16 is a schematic structural diagram of the power control apparatus according to Embodiment 9 of the present invention.

In an application scenario of the embodiment of the present invention, as shown in FIG. 16, the apparatus further includes:

a third setting unit 1601, which may be configured to execute step 601 in method Embodiment 5, namely, set a UE executing a packet switched domain service as a UE on which down-regulation is preferentially performed.

The third setting unit 1601 may be further configured to execute step 601 in method Embodiment 5, namely, before the second determining unit 1401 determines whether the RTWP of the air interface of the base station exceeds the first congestion threshold value, set a UE without data transmission as a UE on which down-regulation is preferentially performed.

The third setting unit 1601 may set a UE on which down-regulation is preferentially performed according to a sensitivity degree to QoS. For example, a voice service in a circuit switched domain is sensitive to QoS, a data packet uploading service in a packet switched domain is insensitive to QoS, and a UE executing a packet switched domain service may be set as a UE on which down-regulation is preferentially performed. The voice service is sensitive to QoS, so excessively small transmit power of the UE causes transient stagnation or even a call drop of a call service, thereby causing a large influence on user experience. When transmit power of a service of uploading a data packet is small, although an uploading stagnation phenomenon also occurs in a procedure of data packet uploading, no excessively large utility cut-down is generated for a user; therefore, comparatively speaking, when transmit power of some UEs needs to be reduced, transmit power of a UE executing a circuit switched domain service needs to be preferentially protected, and transmit power of the UE executing the packet switched domain service may be preferentially down-regulated.

In an application scenario of the embodiment of the present invention, the third setting unit 1601 may further set, according to whether a UE is performing data transmission, a UE on which down-regulation is preferentially performed. For example, a UE performing no data transmission may be set as a UE on which down-regulation is preferentially performed. From the perspective of network operation, maintaining transmit power of the UE performing no data transmission is a waste of power of the air interface of the base station, while from the perspective of user utility, in a UE with data transmission and a UE without data transmission, transmit power of the UE with data transmission should be preferentially ensured, so comparatively speaking, when transmit power of some UEs needs to be reduced, the transmit power of the UE with data transmission needs to be preferentially protected, and transmit power of the UE without data transmission may be preferentially down-regulated.

In an application scenario of the embodiment of the present invention, the third setting unit 1601 may set, by combining the foregoing two setting manners, a UE on which down-regulation is preferentially performed. For example, a UE performing no data transmission is further selected from a UE executing a packet switched domain service, and down-regulation is preferentially performed on the UE. Furthermore, in a power down-regulating procedure, for the UE performing no data transmission, transmit power of the UE may be down-regulated to a power level as long as the power level can ensure transmission quality of a control channel. The foregoing may all be set, adjusted and combined by an operator according to an operating policy in an actual operating environment, which is not limited in the embodiment of the present invention.

Figure 17:
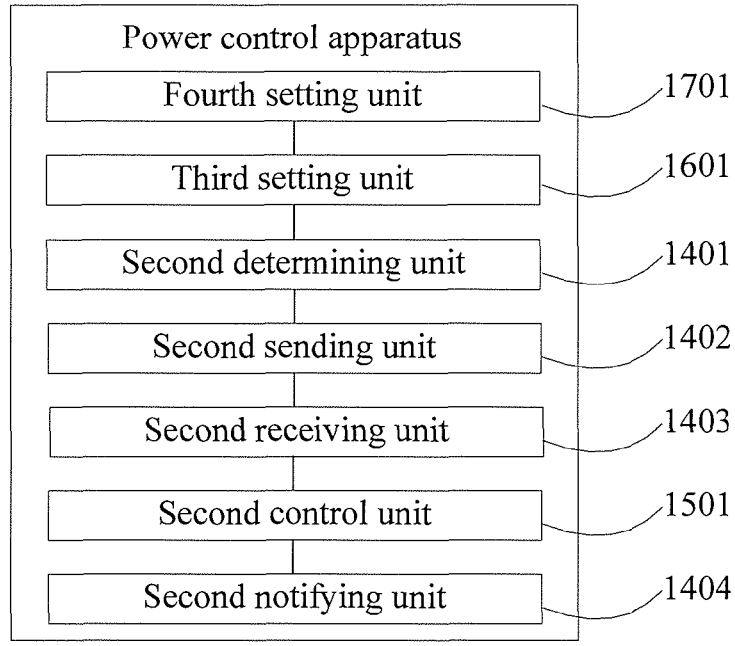
FIG. 17 is a schematic structural diagram of the power control apparatus according to Embodiment 9 of the present invention.

In an application scenario of the embodiment of the present invention, as shown in FIG. 17, the apparatus further includes:

a fourth setting unit 1701, which may be configured to execute step 602 in method Embodiment 5, namely, set a second congestion threshold value.

The second congestion threshold value is less than the first congestion threshold value. A purpose of setting the second congestion threshold value by the fourth setting unit 1701 lies in that, when the RTWP of the air interface of the base station reaches the second congestion threshold value but has not reached the first congestion threshold value yet, transmit power of a part of UEs is down-regulated in advance, so as to alleviate a part of power pressure of the air interface of the base station before the RTWP of the air interface of the base station reaches the first congestion threshold value. The part of UEs is the UE on which down-regulation is preferentially performed set by the third setting unit 1601.

The second determining unit 1401 may be further configured to determine whether the RTWP of the air interface of the base station exceeds the second congestion threshold value set by the fourth setting unit 1701.

In an application scenario of the embodiment of the present invention, when the RTWP of the air interface of the base station exceeds the second congestion threshold value:

the second receiving unit 1403 may be further configured to execute step 603 in method Embodiment 5, namely, receive a target SIR of the UE on which down-regulation is preferentially performed that is sent by the RNC;

the second control unit 1501 may be further configured to execute step 603 in method Embodiment 5, namely, down-regulate the target SIR of the UE on which down-regulation is preferentially performed that is sent by the RNC and received by the second receiving unit 1403; and the second notifying unit 1404 may be further configured to execute step 603 in method Embodiment 5, namely, notify, based on the target SIR down-regulated by the second control unit 1501, the UE on which down-regulation is preferentially performed to reduce transmit power.

Figure 18:
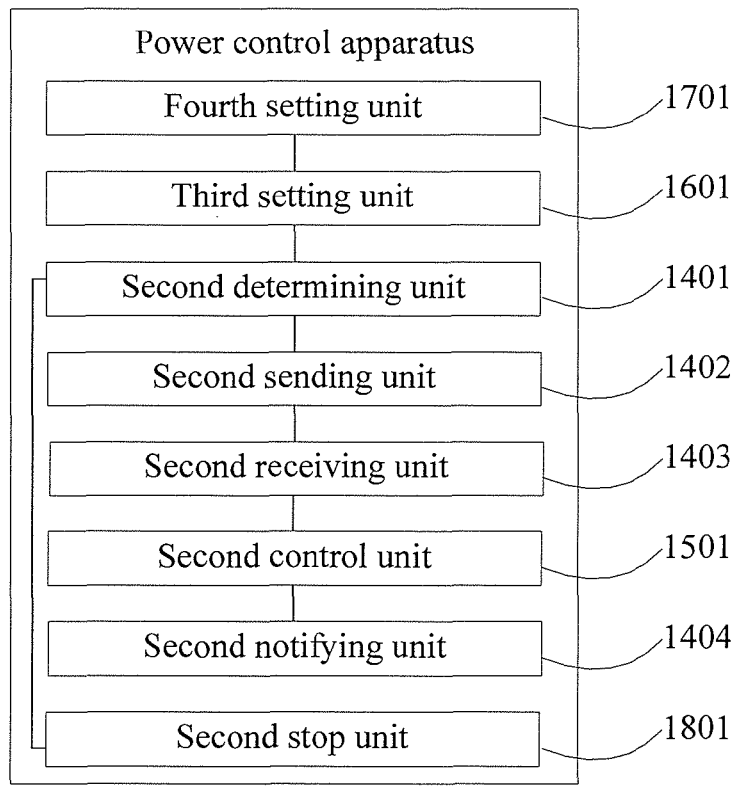
FIG. 18 is a schematic structural diagram of the power control apparatus according to Embodiment 9 of the present invention.

In an application scenario of the embodiment of the present invention, as shown in FIG. 18, the apparatus further includes:

a second stop unit 1801, which may be configured to stop uplink packet scheduling.

Compared with a circuit switched domain service, QoS sensitivity of a packet switched domain service is low, and when the RTWP of the air interface of the base station exceeds the first congestion threshold value, the second stop unit 1801 may preferentially stop a packet switched domain from continuously uploading a large data packet, so as to alleviate power pressure of the air interface of the base station. For example, a larger data packet of the user may be temporarily stopped from being uploaded, and from the perspective of a user plane, in a case that transmission time for uploading service data is long, waiting time added by short-time uplink stop of a large data packet cuts down marginal utility of the user, and the cut-down does not cause more influence on user experience.

In an application scenario of the embodiment of the present invention, the second control unit 1501 may be further configured to: when the RTWP of the air interface of the base station is less than the first congestion threshold value, up-regulate the target SIR sent by the RNC, where the up-regulated target SIR is not greater than a target SIR sent by the RNC when the RTWP of the air interface of the base station is equal to the first congestion threshold value.

When the RTWP of the air interface of the base station declines to a value lower than the first congestion threshold value, the second control unit 1501 may up-regulate the target SIR sent by the RNC. A purpose of up-regulating the target SIR lies in that, after the power pressure of the air interface of the base station is alleviated, the transmit power of the UE is up-regulated in a manner of up-regulating the target SIR, so as to improve a success ratio at which the UE sends a data packet. The second control unit 1501 steadily up-regulates the target SIR with a small step, and that the target SIR to be up-regulated does not exceed the target SIR sent by the RNC and received by the second receiving unit 1403 is taken as a limitation, thereby improving the success ratio at which the UE sends a data packet as much as possible and ensuring quality of a user service in a case that the RTWP of the air interface of the base station does not exceed the first congestion threshold value again.

In an actual application, the apparatus in the embodiment of the present invention may be, but is not limited to, a base station (Node B, NB), an evolved base station (evolved Node B, eNB) or an access point (Access Point, AP), which is not limited in the embodiment of the present invention.

In the power control apparatus provided in the embodiment of the present invention, rise of a target SIR of a UE can be limited in a case of power congestion of an air interface of a base station, which avoids congestion pressure formed by further rise of transmit power of the UE on already excessively high RTWP of the air interface of the base station.

Furthermore, in an application scenario of the embodiment of the present invention, a value of the target SIR which is already limited to rise can also be down-regulated, so as to reduce the transmit power of the UE. A problem of power congestion of the air interface of the base station is solved, a state of a system is stabilized, and service quality of an edge user and a QoS-sensitive user is ensured.

Furthermore, in an application scenario of the embodiment of the present invention, before the RTWP of the air interface of the base station reaches the first congestion threshold value, transmit power of a part of UEs executing a QoS-insensitive service and/or performing no data transmission in the cell can be further preferentially down-regulated. These UEs having a small influence on the user utility make more contribution to down-regulation of the RTWP of the air interface of the base station, transmit power of a UE executing a QoS-sensitive service is further ensured or increased at the same time, and in a case of reducing the RTWP of the air interface of the base station, it is ensured that the service quality of the QoS-sensitive user is not affected by the down-regulation of the RTWP of the air interface of the base station.

Furthermore, in an application scenario of the embodiment of the present invention, abnormality protection can be further set for the RNC, and while it is ensured that the RTWP of the air interface of the base station does not exceed the first congestion threshold value, the data packet transmission success ratio can be further considered at the same time.

Embodiment 10

Figure 19:
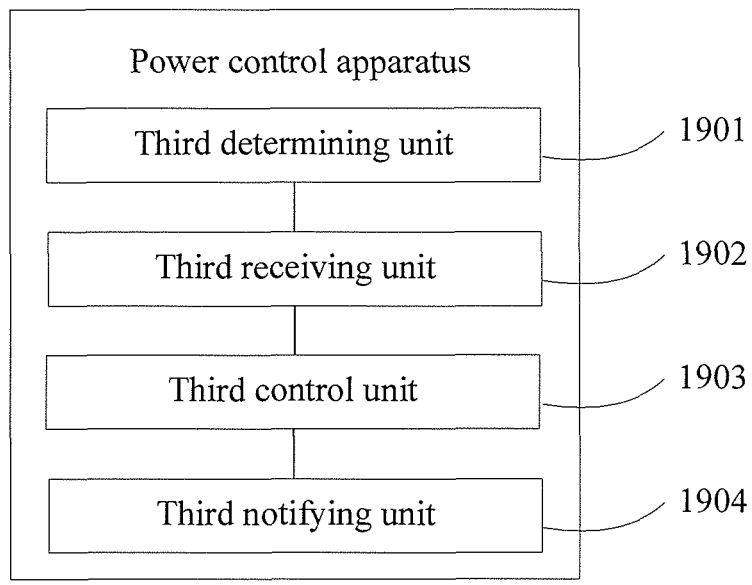
FIG. 19 is a schematic structural diagram of a power control apparatus according to Embodiment 10 of the present invention.

With reference to implementation of the foregoing method embodiments, the embodiment of the present invention provides a power control apparatus, which may be configured to implement the foregoing method embodiments of the present invention. As shown in FIG. 19, the apparatus includes: a third determining unit 1901, a third receiving unit 1902, a third control unit 1903 and a third notifying unit 1904.

The third determining unit 1901 may be configured to execute step 903 in method Embodiment 7, namely, determine whether RTWP of an air interface of a base station exceeds a first congestion threshold value.

The RTWP of the air interface is a sum of transmit power of all UEs pertaining to the base station. When the RTWP of the air interface exceeds the first congestion threshold value, a congestion phenomenon occurs in the base station, a state of the cell is unstable, and coverage quality of an edge user declines. Particularly for a service sensitive to QoS, such as voice service, a phenomenon, such as transient call stagnation or a voice delay, is generated easily, and a call drop phenomenon is further generated in a serious case, thereby affecting service experience of a user. Therefore, when the RTWP of the air interface of the base station exceeds the first congestion threshold value, the RTWP on the air interface of the base station needs to be limited.

The third receiving unit 1902 may be configured to execute step 901 in method Embodiment 7, namely, receive a target SIR sent by an RNC.

The third control unit 1903 may be configured to execute step 904 in method Embodiment 7, namely, down-regulate the target SIR sent by the RNC and received by the third receiving unit 1902.

The third control unit 1903 down-regulates the target SIR sent by the RNC, so as to reduce the target SIR of the UE, and further reduce the transmit power of the UE, thereby reducing the RTWP of the air interface of the base station to a value lower than the first congestion threshold value.

The third notifying unit 1904 may be configured to execute step 905 in method Embodiment 7, namely, notify, according to the target SIR down-regulated by the third control unit 1903, a UE to down-regulate transmit power.

An SIR is defined as a ratio of transmit power to an interference signal when a UE transmits uplink data. For a certain UE, magnitude of an interference signal generally does not greatly change, and may be approximately considered unchanged. When the target SIR is down-regulated by the RNC, the transmit power of the UE also declines, thereby achieving a purpose of down-regulating the transmit power of the UE and the RTWP of the air interface of the base station. For example, in a WCDMA network, different carriers use a same frequency point, which generates a self-interference phenomenon, namely, for a certain UE, transmit power of another UE is an interference signal of the UE. Numerous UEs exist in the cell, so for a UE, an interference signal generated by another UE is approximately stable. Therefore, a value of an actual SIR of the UE may be limited by limiting the transmit power of the UE.

Figure 20:
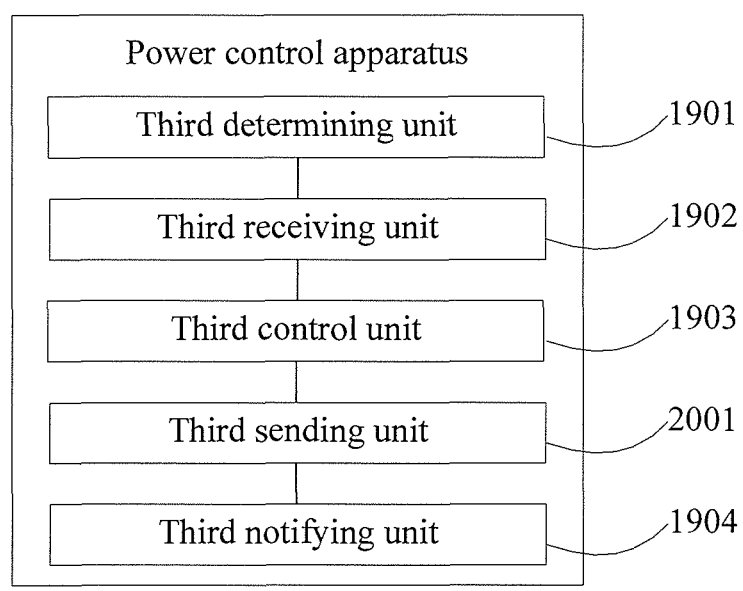
FIG. 20 is a schematic structural diagram of the power control apparatus according to Embodiment 10 of the present invention.

In an application scenario of the embodiment of the present invention, as shown in FIG. 20, the apparatus further includes:

a third sending unit 2001, which may be configured to: when the RTWP of the air interface of the base station exceeds the first congestion threshold value, send a congestion indication to the RNC.

The congestion indication is used for indicating that the RNC is forbidden from up-regulating a target SIR. The RNC may adjust a target SIR of a UE according to a block error rate, an HARQ retransmission rate or an air interface packet loss rate when the UE uploads data. Taking the block error rate as an example: If the block error rate is high when the UE uploads data, the RNC up-regulates the target SIR of the UE, so as to increase transmit power of the UE, thereby reducing the block error rate; if the block error rate is small when the UE uploads data, in order to save transmit power of uplink data, the RNC down-regulates the target SIR of the UE, so as to reduce the transmit power of the UE. When congestion occurs in the air interface of the base station, in order to ensure whole stability of the network, even if the block error rate is high when the UE uploads data, the RNC is not allowed to up-regulate the target SIR of the UE, thereby ensuring that the RTWP of the air interface of the base station does not further rise.

It should be noted that, after the third sending unit 2001 sends the congestion indication to the RNC, the RNC is forbidden from up-regulating the target SIR of the UE, but if the block error rate is small when the UE uploads data, the RNC may down-regulate the target SIR of the UE. Down-regulation of the target SIR of the UE does not further increase the RTWP of the air interface of the base station, while instead, further reduces the RTWP of the air interface of the base station, so a function of down-regulating the target SIR of the UE by the RNC is not limited.

In an application scenario of the embodiment of the present invention, the third receiving unit 1902 may be further configured to receive the target SIR limited by the RNC to rise. After receiving the congestion indication sent by the third sending unit 2001, the RNC limits further rise of the target SIR, and sends the target SIR limited to rise to the third receiving unit 1902.

Figure 21:
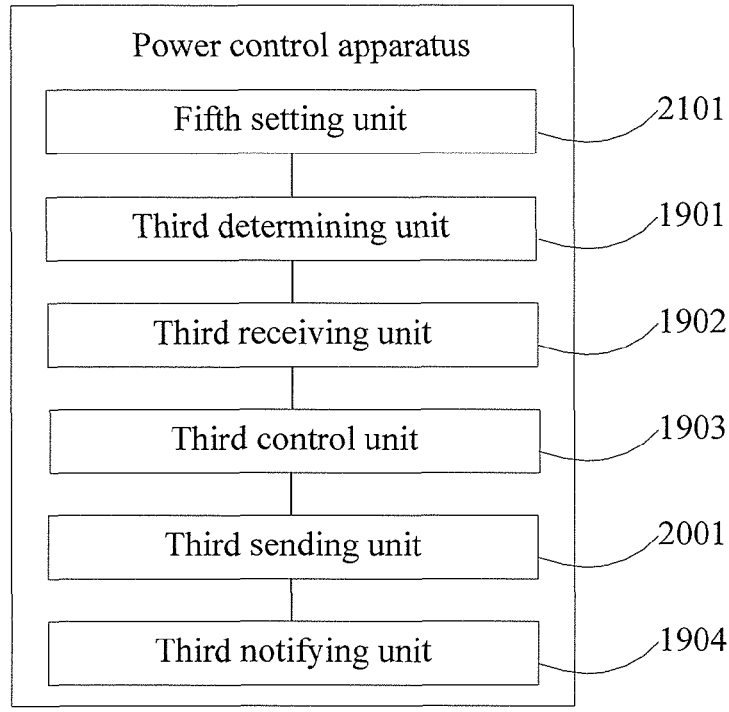
FIG. 21 is a schematic structural diagram of the power control apparatus according to Embodiment 10 of the present invention.

In an application scenario of the embodiment of the present invention, as shown in FIG. 21, the apparatus further includes:

a fifth setting unit 2101, which may be configured to execute step 601 in method Embodiment 5, namely, set a UE executing a packet switched domain service as a UE on which down-regulation is preferentially performed.

The fifth setting unit 2101 may be further configured to execute step 601 in method Embodiment 5, namely, before the third determining unit 1901 determines whether the RTWP of the air interface of the base station exceeds the first congestion threshold value, set a UE without data transmission as a UE on which down-regulation is preferentially performed.

The fifth setting unit 2101 may set a UE on which down-regulation is preferentially performed according to a sensitivity degree to QoS. For example, a voice service in a circuit switched domain is sensitive to QoS, a data packet uploading service in a packet switched domain is insensitive to QoS, and a UE executing a packet switched domain service may be set as a UE on which down-regulation is preferentially performed. The voice service is sensitive to QoS, so excessively small transmit power of the UE causes transient stagnation or even a call drop of a call service, thereby causing a large influence on user experience. When transmit power of a service of uploading a data packet is small, although an uploading stagnation phenomenon also occurs in a procedure of data packet uploading, no excessively large utility cut-down is generated for a user; therefore, comparatively speaking, when transmit power of some UEs needs to be reduced, transmit power of a UE executing a circuit switched domain service needs to be preferentially protected, and transmit power of the UE executing the packet switched domain service may be preferentially down-regulated.

In an application scenario of the embodiment of the present invention, the fifth setting unit 2101 may further set, according to whether a UE is performing data transmission, a UE on which down-regulation is preferentially performed. For example, a UE performing no data transmission may be set as a UE on which down-regulation is preferentially performed. From the perspective of network operation, maintaining transmit power of the UE performing no data transmission is a waste of power of the air interface of the base station, while from the perspective of user utility, in a UE with data transmission and a UE without data transmission, transmit power of the UE with data transmission should be preferentially ensured, so comparatively speaking, when transmit power of some UEs needs to be reduced, the transmit power of the UE with data transmission needs to be preferentially protected, and transmit power of the UE without data transmission may be preferentially down-regulated.

In an application scenario of the embodiment of the present invention, the fifth setting unit 2101 may set, by combining the foregoing two setting manners, a UE on which down-regulation is preferentially performed. For example, a UE performing no data transmission is further selected from a UE executing a packet switched domain service, and down-regulation is preferentially performed on the UE. Furthermore, in a power down-regulating procedure, for the UE performing no data transmission, transmit power of the UE may be down-regulated to a power level as long as the power level can ensure transmission quality of a control channel. The foregoing may all be set, adjusted and combined by an operator according to an operating policy in an actual operating environment, which is not limited in the embodiment of the present invention.

Figure 22:
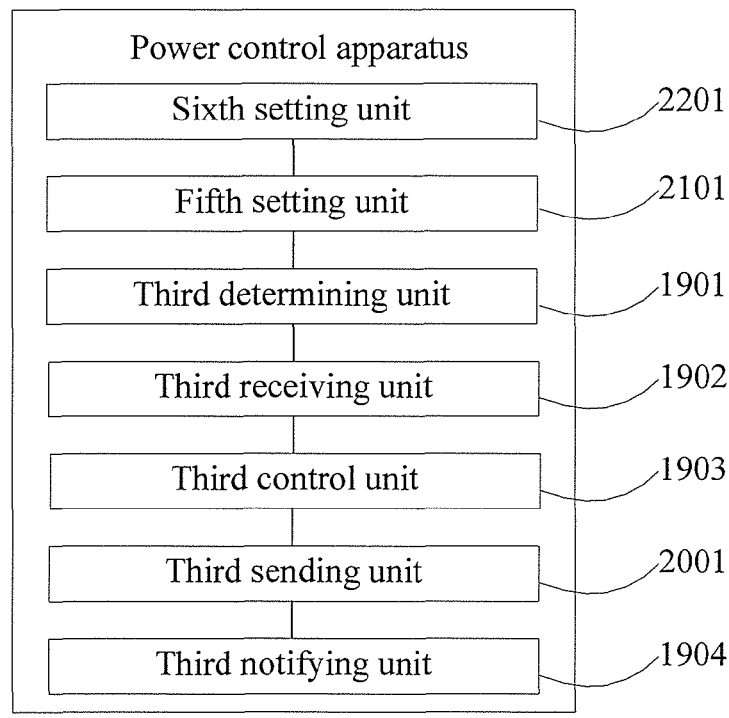
FIG. 22 is a schematic structural diagram of the power control apparatus according to Embodiment 10 of the present invention.

In an application scenario of the embodiment of the present invention, as shown in FIG. 22, the apparatus further includes:

a sixth setting unit 2201, which may be configured to execute step 602 in method Embodiment 5, namely, set a second congestion threshold value.

The second congestion threshold value is less than the first congestion threshold value. A purpose of setting the second congestion threshold value by the sixth setting unit 2201 lies in that, when the RTWP of the air interface of the base station reaches the second congestion threshold value but has not reached the first congestion threshold value yet, transmit power of a part of UEs is down-regulated in advance, so as to alleviate a part of power pressure of the air interface of the base station before the RTWP of the air interface of the base station reaches the first congestion threshold value. The part of UEs is the UE on which down-regulation is preferentially performed set by the fifth setting unit 2101.

The third determining unit 1901 may be further configured to execute step 602 in method Embodiment 5, namely, determine whether the RTWP of the air interface of the base station exceeds the second congestion threshold value set by the sixth setting unit 2201.

In an application scenario of the embodiment of the present invention, when the RTWP of the air interface of the base station exceeds the second congestion threshold value:

the third receiving unit 1902 may be further configured to execute step 603 in method Embodiment 5, namely, receive a target SIR of the UE on which down-regulation is preferentially performed that is sent by the RNC;

the third control unit 1903 may be further configured to execute step 603 in method Embodiment 5, namely, down-regulate the target SIR of the UE on which down-regulation is preferentially performed that is sent by the RNC and received by the third receiving unit 1902; and the third notifying unit 1904 may be further configured to execute step 603 in method Embodiment 5, namely, notify, based on the target SIR down-regulated by the third control unit 1903, the UE on which down-regulation is preferentially performed to reduce the transmit power.

Figure 23:
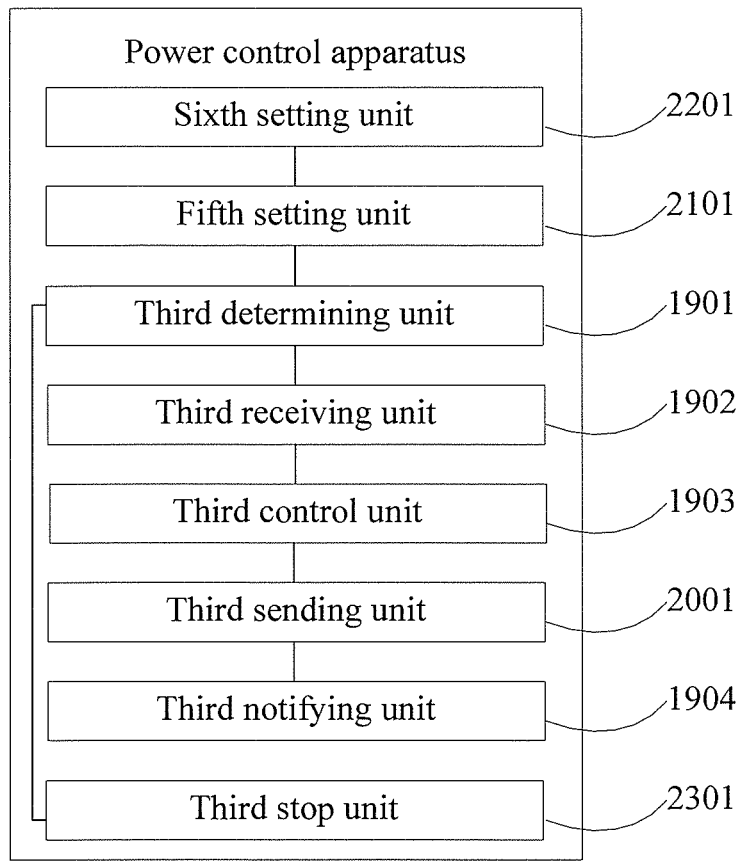
FIG. 23 is a schematic structural diagram of the power control apparatus according to Embodiment 10 of the present invention.

In an application scenario of the embodiment of the present invention, as shown in FIG. 23, the apparatus further includes:

a third stop unit 2301, which may be configured to stop uplink packet scheduling.

Compared with a circuit switched domain service, QoS sensitivity of a packet switched domain service is low, and when the RTWP of the air interface of the base station exceeds the first congestion threshold value, the third stop unit 2301 may preferentially stop a packet switched domain from continuously uploading a large data packet, so as to alleviate power pressure of the air interface of the base station. For example, a larger data packet of the user may be temporarily stopped from being uploaded, and from the perspective of a user plane, in a case that transmission time for uploading service data is long, waiting time added by short-time uplink stop of a large data packet cuts down marginal utility of the user, and the cut-down does not cause more influence on user experience.

In an application scenario of the embodiment of the present invention, the third control unit 1903 may be further configured to: when the RTWP of the air interface of the base station is less than the first congestion threshold value, up-regulate the target SIR sent by the RNC, where the up-regulated target SIR is not greater than the target SIR sent by the RNC when the RTWP of the air interface of the base station exceeds the first congestion threshold value.

When the RTWP of the air interface of the base station declines to a value lower than the first congestion threshold value, the third control unit 1903 may up-regulate the target SIR sent by the RNC. A purpose of up-regulating the target SIR lies in that, after the power pressure of the air interface of the base station is alleviated, the transmit power of the UE is up-regulated in a manner of up-regulating the target SIR, so as to improve a success ratio at which the UE sends a data packet. The third control unit 1903 steadily up-regulates the target SIR with a small step, and that the target SIR to be up-regulated does not exceed the target SIR sent by the RNC and received by the third receiving unit 1902 is taken as a limitation, thereby improving the success ratio at which the UE sends a data packet as much as possible and ensuring quality of a user service in a case that the RTWP of the air interface of the base station does not exceed the first congestion threshold value again.

In an actual application, the apparatus in the embodiment of the present invention may be, but is not limited to, a base station (Node B, NB), an evolved base station (evolved Node B, eNB) or an access point (Access Point, AP), which is not limited in the embodiment of the present invention.

The power control apparatus provided in the embodiment of the present invention is capable of down-regulating a value of the target SIR sent by the RNC, so as to reduce the transmit power of the UE. A problem of power congestion of the air interface of the base station is solved, a state of a system is stabilized, and service quality of an edge user and a QoS-sensitive user is ensured.

Furthermore, in an application scenario of the embodiment of the present invention, rise of a target SIR of a UE can be limited in a case of power congestion of an air interface of a base station, which avoids congestion pressure formed by further rise of transmit power of the UE on already excessively high RTWP of the air interface of the base station.

Furthermore, in an application scenario of the embodiment of the present invention, before the RTWP of the air interface of the base station reaches the first congestion threshold value, transmit power of a part of UEs executing a QoS-insensitive service and/or performing no data transmission in the cell can be further preferentially down-regulated. These UEs having a small influence on the user utility make more contribution to down-regulation of the RTWP of the air interface of the base station, transmit power of a UE executing a QoS-sensitive service is further ensured or increased at the same time, and in a case of reducing the RTWP of the air interface of the base station, it is ensured that the service quality of the QoS-sensitive user is not affected by the down-regulation of the RTWP of the air interface of the base station.

Furthermore, in an application scenario of the embodiment of the present invention, abnormality protection can be further set for the RNC, and while it is ensured that the RTWP of the air interface of the base station does not exceed the first congestion threshold value, the data packet transmission success ratio can be further considered at the same time.

Embodiment 11

Figure 24:
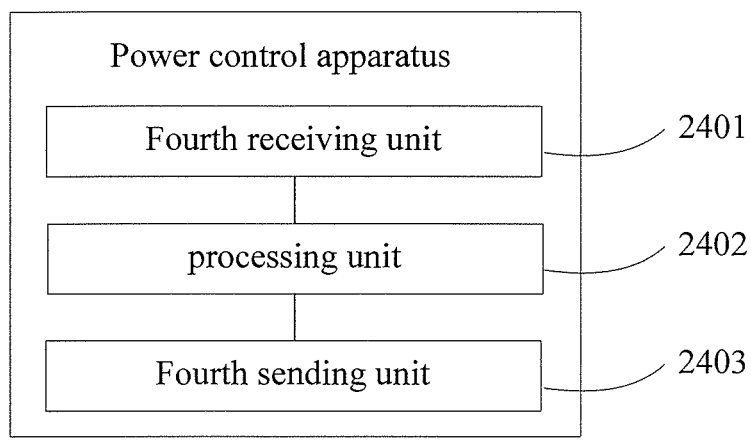
FIG. 24 is a schematic structural diagram of a power control apparatus according to Embodiment 11 of the present invention.

With reference to implementation of the foregoing method embodiments, the embodiment of the present invention provides a power control apparatus, which may be configured to implement the foregoing method embodiments of the present invention. As shown in FIG. 24, the apparatus includes: a fourth receiving unit 2401, a processing unit 2402 and a fourth sending unit 2403.

The fourth receiving unit 2401 may be configured to execute step 401 in method Embodiment 4, namely, when a base station determines that RTWP of an air interface of the base station exceeds a first congestion threshold value, receive a congestion indication sent by the base station.

The congestion indication is used for indicating that an RNC is forbidden from up-regulating a target SIR. The RNC may adjust a target SIR of a UE according to a block error rate, an HARQ retransmission rate or an air interface packet loss rate when the UE uploads data. Taking the block error rate as an example: If the block error rate is high when the UE uploads data, the RNC up-regulates the target SIR of the UE, so as to increase transmit power of the UE, thereby reducing the block error rate; if the block error rate is small when the UE uploads data, in order to save transmit power of uplink data, the RNC down-regulates the target SIR of the UE, so as to reduce the transmit power of the UE. When congestion occurs in the air interface of the base station, in order to ensure whole stability of the network, even if the block error rate is high when the UE uploads data, the RNC is not allowed to up-regulate the target SIR of the UE, thereby ensuring that the RTWP of the air interface of the base station does not further rise.

The processing unit 2402 may be configured to execute step 402 in method Embodiment 4, namely, forbid, according to the congestion indication received by the fourth receiving unit 2401, up-regulating of the target SIR.

After the base station sends the congestion indication to the RNC, the processing unit 2402 forbids the RNC from up-regulating the target SIR of the UE, but if the block error rate is small when the UE uploads data, the processing unit 2402 allows the RNC to down-regulate the target SIR of the UE. Down-regulation of the target SIR of the UE does not further increase the RTWP of the air interface of the base station, while instead, further reduces the RTWP of the air interface of the base station, so a function of down-regulating the target SIR of the UE is not limited.

The fourth sending unit 2403 may be configured to execute step 403 in method Embodiment 4, namely, send the target SIR processed by the processing unit 2402 to the base station.

In an application scenario of the embodiment of the present invention, the processing unit 2402 is further configured to lift a ban on up-regulation of the target SIR. After the air interface of the base station reaches the first congestion threshold value, the processing unit 2402 forbids the RNC from up-regulating the target SIR. If in a period of time, the fourth receiving unit 2401 does not receive a congestion indication resent by the base station, the processing unit 2402 automatically removes the limitation of forbidding the RNC from up-regulating the target SIR, and the RNC may up-regulate or down-regulate the target SIR of the UE according to the block error rate, the HARQ retransmission rate or the air interface packet loss rate when the UE uploads the data. The period of time is a ban lifting duration set by an operator according to an actual operating environment. A function of forbidding the RNC from up-regulating the target SIR by the processing unit 2402 may limit further rise of the RTWP of the air interface of the base station, but this limitation is at the cost of reducing a data packet transmission success ratio. In an operating procedure, at the same time of ensuring that the RTWP of the air interface of the base station does not exceed the first congestion threshold value, the data packet transmission success ratio needs to be further considered, so the RNC needs to be protected from abnormality.

In an application scenario of the embodiment of the present invention, after receiving the target SIR which is limited to rise and is sent by the RNC, the base station may further down-regulate the target SIR limited to rise, and then notify, according to the down-regulated SIR, the UE to reduce the transmit power, thereby achieving a purpose of controlling power pressure of the air interface of the base station.

In an actual application, the apparatus in the embodiment of the present invention may be a radio network controller (Radio Network Controller, RNC), or a physical or logical device having a function involved in a radio network controller, and the radio network controller does not limit the apparatus in the embodiment of the present invention.

In the power control apparatus provided in the embodiment of the present invention, rise of a target SIR of a UE can be limited in a case of power congestion of an air interface of a base station, which avoids congestion pressure formed by further rise of transmit power of the UE on already excessively high RTWP of the air interface of the base station. Meanwhile, in an application scenario of the embodiment of the present invention, a value of the target SIR which is already limited to rise can also be down-regulated, so as to reduce the transmit power of the UE. A problem of power congestion of the air interface of the base station is solved, a state of a system is stabilized, and service quality of an edge user and a QoS-sensitive user is ensured.

Furthermore, in an application scenario of the embodiment of the present invention, the power control apparatus provided in the embodiment of the present invention is further capable of setting abnormality protection for the RNC, and while it is ensured that the RTWP of the air interface of the base station does not exceed the first congestion threshold value, the data packet transmission success ratio is further considered at the same time.

Through the foregoing description of the implementation manners, persons skilled in the art may be clearly understand that the present invention may be implemented by software plus necessary universal hardware, and definitely, may also be implemented by hardware, but in many cases, the former is a preferred implementation manner. Based on such an understanding, the technical solutions of the present invention essentially, or the part contributing to the prior art may be embodied in a form of a software product. The computer software product is stored in a readable storage medium, for example, a floppy disk, a hard disk, or an optical disk of a computer, and includes several instructions for instructing a computer device (which may be a personal computer, a server, or a network device, or the like) to perform the methods described in the embodiments of the present invention.

The foregoing description is merely specific implementation manners of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A power control apparatus, comprising:
at least one processor configured to determine whether received total wideband power (RTWP) of an air interface exceeds a set first congestion threshold value;
a transmitter configured to, when the at least one processor determines that the RTWP of the air interface exceeds the set first congestion threshold value, send a congestion indication to a radio network controller (RNC), wherein the congestion indication is used for indicating that the RNC is forbidden from up-regulating a target signal-to-interference ratio (SIR); and
a receiver configured to receive a target SIR sent by the RNC;
wherein the at least one processor is further configured to down-regulate the target SIR sent by the RNC and received by the receiver; and
wherein the transmitter is further configured to notify, based on the target SIR down-regulated by the at least one processor, a user equipment (UE) to reduce transmit power.

2. The power control apparatus according to claim 1, wherein the at least one processor is configured to:
set a UE executing a packet switched domain service as a UE on which down-regulation is preferentially performed; and
set a UE without data transmission as a UE on which down-regulation is preferentially performed.

3. The power control apparatus according to claim 2, wherein:
the at least one processor is further configured to set a second congestion threshold value, wherein the second congestion threshold value is less than the first congestion threshold value,
the at least one processor is further configured to determine whether the RTWP of the air interface exceeds the second congestion threshold value ;and
when the RTWP of the air interface exceeds the second congestion threshold value:

the receiver is further configured to receive a target SIR of the UE on which down-regulation is preferentially performed that is sent by the RNC;
the at least one processor is further configured to down-regulate the target SIR of the UE on which down-regulation is preferentially performed that is sent by the RNC and received by the receiver; and
the transmitter is further configured to notify, based on the target SIR down-regulated by the at least one processor, the UE on which down-regulation is preferentially performed to reduce transmit power.

4. The power control apparatus according to claim 1, wherein the at least one processor is further configured to stop uplink packet scheduling.

5. The power control apparatus according to claim 1, wherein the at least one processor is further configured to, when the RTWP of the air interface is less than the first congestion threshold value, up-regulate the target SIR sent by the RNC, wherein the up-regulated target SIR is not greater than a target SIR sent by the RNC when the RTWP of the air interface is equal to the first congestion threshold value.

6. A power control apparatus, comprising:
at least one processor configured to determine whether received total wideband power (RTWP) of an air interface exceeds a set first congestion threshold value;
a transmitter configured to, when the at least one processor determines that the RTWP of the air interface exceeds the set first congestion threshold value, send a congestion indication to a radio network controller (RNC), wherein the congestion indication is used for indicating that the RNC is forbidden from up-regulating a target signal-to-interference ratio (SIR); and
a receiver configured to receive a target SIR sent by the RNC;
wherein the transmitter is further configured to notify, based on the target SIR sent by the RNC and received by the receiver, a user equipment (UE) to limit transmit power.

7. The power control apparatus according to claim 6, wherein:
the at least one processor is further configured to, after the receiver receives the target SIR sent by the RNC, down-regulate the target SIR sent by the RNC, and
the transmitter is further configured to notify, based on the target SIR down-regulated by the at least one processor, the user equipment UE to reduce the transmit power.

8. The power control apparatus according to claim 6, wherein the at least one processor is configured to:
set a UE executing a packet switched domain service as a UE on which down-regulation is preferentially performed; and
set a UE without data transmission as a UE on which down-regulation is preferentially performed.

9. The power control apparatus according to claim 8, wherein:
the at least one processor is further configured to set a second congestion threshold value, wherein the second congestion threshold value is less than the first congestion threshold value,
the at least one processor is further configured to determine whether the RTWP of the air interface exceeds the second congestion threshold value; and
when the RTWP of the air interface exceeds the second congestion threshold value:

the receiver is further configured to receive a target SIR of the UE on which down-regulation is preferentially performed that is sent by the RNC;

the at least one processor is further configured to down-regulate the target SIR of the UE on which down-regulation is preferentially performed that is sent by the RNC and received by the receiver; and the transmitter is further configured to notify, based on the target SIR down-regulated by the at least one processor, the UE on which down-regulation is preferentially performed to reduce transmit power.

10. The power control apparatus according to claim 6, wherein the at least one processor is further configured to stop uplink packet scheduling.

11. The power control apparatus according to claim 6, wherein:

the at least one processor is further configured to up-regulate the target SIR sent by the RNC when the RTWP of the air interface is less than the first congestion threshold value, wherein the up-regulated target SIR is not greater than a target SIR sent by the RNC when the RTWP of the air interface is equal to the first congestion threshold value.

12. A power control apparatus, comprising:

a receiver configured to receive a target signal-to-interference ratio (SIR) sent by a radio network controller (RNC);

at least one processor configured to:
determine whether received total wideband power (RTWP) of an air interface exceeds a set first congestion threshold value; and
when the RTWP of the air interface exceeds the set first congestion threshold value, down-regulate the target SIR sent by the RNC; and a transmitter configured to notify, based on the target SIR down-regulated by the at least one processor, a user equipment (UE) to reduce transmit power.

13. The power control apparatus according to claim 12, wherein:

the transmitter is further configured to, before the receiver receives the target SIR sent by the RNC, send a congestion indication to the RNC, wherein the congestion indication is used for indicating that the RNC is forbidden from up-regulating the target signal-to-interference ratio SIR;

the receiver is further configured to receive the target SIR without being up-regulated that is sent by the RNC; and the at least one processor is further configured to down-regulate the target SIR without being up-regulated that is sent by the RNC and received by the receiver.

14. The power control apparatus according to claim 12, wherein the at least one processor is configured to:

set a UE executing a packet switched domain service as a UE on which down-regulation is preferentially performed; and set a UE without data transmission as a UE on which down-regulation is preferentially performed.

15. The power control apparatus according to claim 14, wherein:

the at least one processor is further configured to set a second congestion threshold value, wherein the second congestion threshold value is less than the first congestion threshold value, the at least one processor is further configured to determine whether the RTWP of the air interface exceeds the second congestion threshold value;

the receiver is further configured to receive a target SIR of the UE on which down-regulation is preferentially performed that is sent by the RNC;

the at least one processor is further configured to down-regulate the target SIR of the UE on which down-regulation is preferentially performed that is sent by the RNC and received by the receiver; and the transmitter is further configured to notify, based on the target SIR down-regulated by the at least one processor, the UE on which down-regulation is preferentially performed to reduce transmit power.

16. The power control apparatus according to claim 15, wherein the at least one processor is further configured to stop uplink packet scheduling.

17. The power control apparatus according to claim 12, wherein:

the at least one processor is further configured to up-regulate the target SIR sent by the RNC when the RTWP of the air interface is less than the first congestion threshold value, wherein the up-regulated target SIR is not greater than a target SIR sent by the RNC when the RTWP of the air interface is equal to the first congestion threshold value.

18. A power control apparatus, comprising:

a receiver configured to, when a base station determines that received total wideband power (RTWP) of an air interface of the base station exceeds a set first congestion threshold value, receive a congestion indication sent by the base station;

at least one processor configured to forbid, according to the congestion indication received by the receiver, up-regulating of a target signal-to-interference ratio (SIR); and a transmitter configured to send the target SIR without being up-regulated to the base station, wherein the at least one processor is further configured to, when the receiver does not receive a next congestion indication sent by the base station in a preset ban lifting duration, lift a ban on up-regulation of the target SIR.

* * * * *